United States Patent [19]
Ullmann et al.

[11] 3,987,270
[45] Oct. 19, 1976

[54] AUTOMATIC SET-UP ELECTROEROSION MACHINING METHOD AND APPARATUS

[75] Inventors: Werner Ullmann, Locarno; Bernd Schumacher, Losone; Arno Sieg; Silvano Mattei, both of Locarno; Hans-Ueli Fenner, Ascona; Gottlieb Wettstein; Herbert Ruh, both of Locarno, all of Switzerland

[73] Assignee: A.G. fur industrielle Elektronik AGIE Losone b. Locarno, Losone, Switzerland

[22] Filed: Sept. 19, 1974

[21] Appl. No.: 507,435

Related U.S. Application Data

[62] Division of Ser. No. 435,206, Jan. 21, 1974, Pat. No. 3,891,819.

[30] Foreign Application Priority Data
Aug. 15, 1973 Switzerland.................. 11780/73

[52] U.S. Cl............................................. 219/69 W
[51] Int. Cl.[2] .......................................... B23P 1/08
[58] Field of Search ............ 219/69 V, 69 E, 69 M, 219/69 R, 125 PL; 222/146, 526; 204/143

[56] References Cited
UNITED STATES PATENTS

| | | |
|---|---|---|
| 3,731,043 | 5/1973 | Ullmann et al. .................. 219/69 V |
| 3,731,044 | 5/1973 | Ullmann et al. .................. 219/69 V |
| 3,731,045 | 5/1973 | Ullmann et al. .................. 219/69 V |
| 3,822,374 | 7/1974 | Ullmann et al. .................. 219/69 V |
| 3,849,624 | 11/1974 | Dulebohn .......................... 219/69 V |

*Primary Examiner*—Bruce A. Reynolds
*Attorney, Agent, or Firm*—William R. Woodward

[57] ABSTRACT

Electroerosion machining (EDM or ECM) is carried out with a minimum of manual intervention. Under control of recorded data an electronic control system utilizing control logic directs the set-up operations as well as the actual machining process. The operations automatically (i.e., without the necessity of manual intervention) include loading and removal of workpieces and electrode material, trueing up of the workpiece (which may be by providing a transformation of the data rather than by adjusting the position of the workpiece), making starting bores, threading the electrode through a starting bore, applying a low melting alloy or other conducting adhesive to cement a core in the process of being cut out by machining, cutting the electrode after completing a starting bore and joining electrode ends after rethreading in a new starting bore. In threading the electrode it may be pushed simply or with the support of a surrounding jet of pressure medium, or it may be pulled by a grapple member.

15 Claims, 46 Drawing Figures

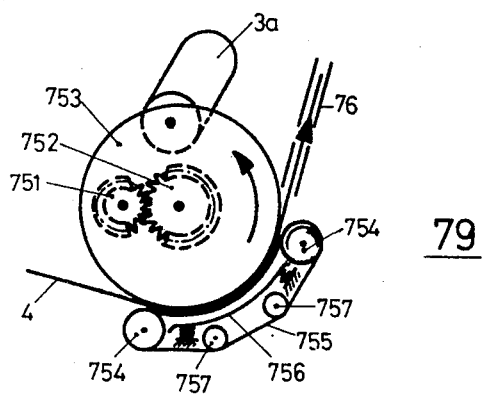
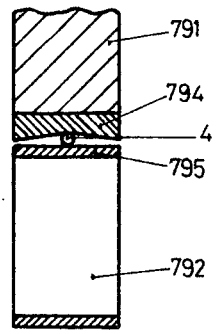
Fig. 7    Fig. 8
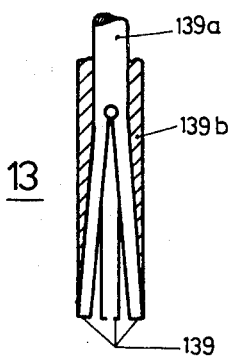 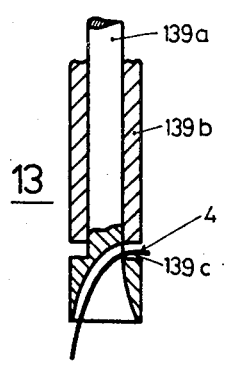 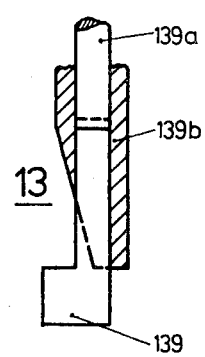 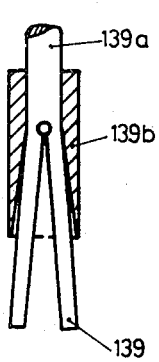
Fig. 10    Fig. 11    Fig. 12a    Fig. 13a
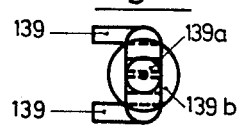 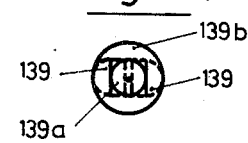
Fig. 12b    Fig. 13b

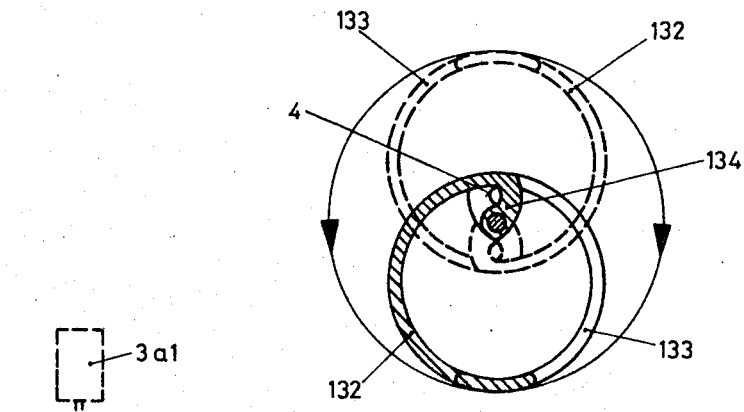
Fig. 9b
Fig. 9a
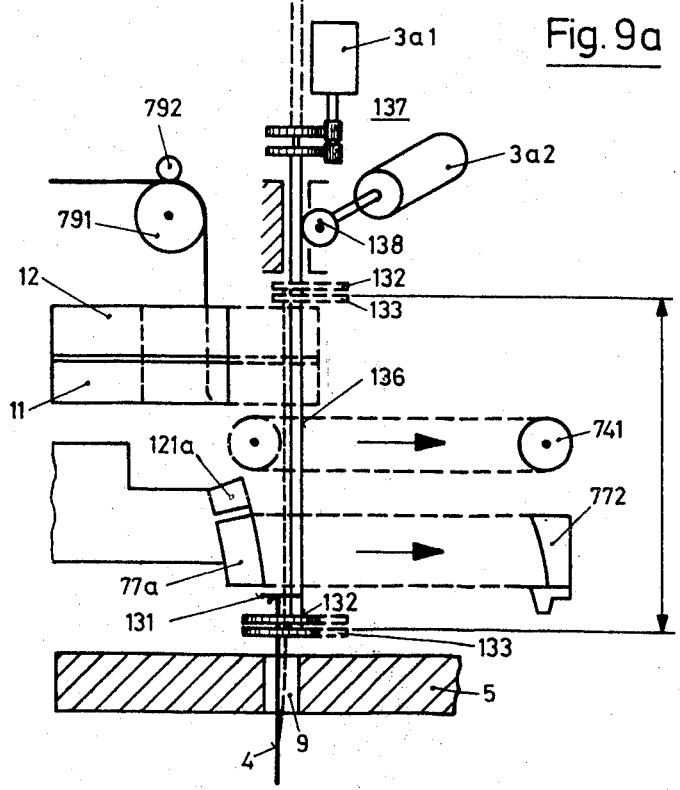

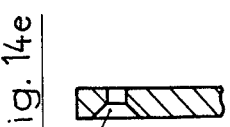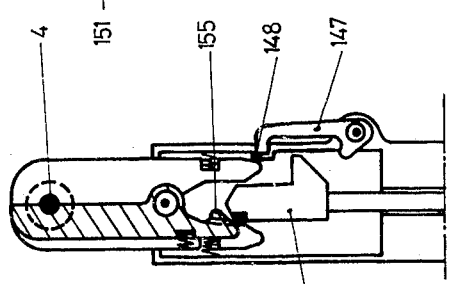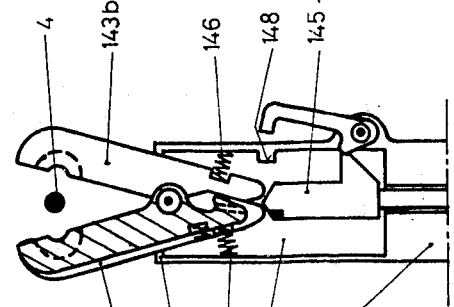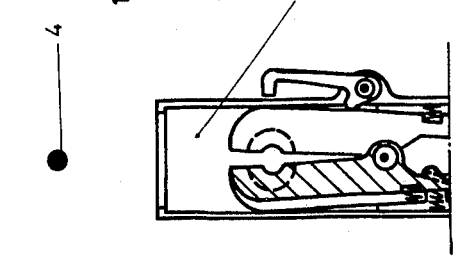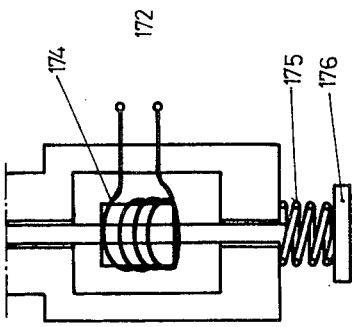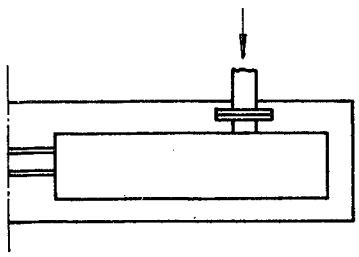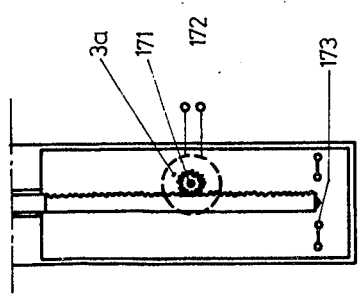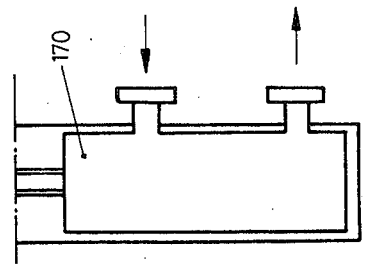

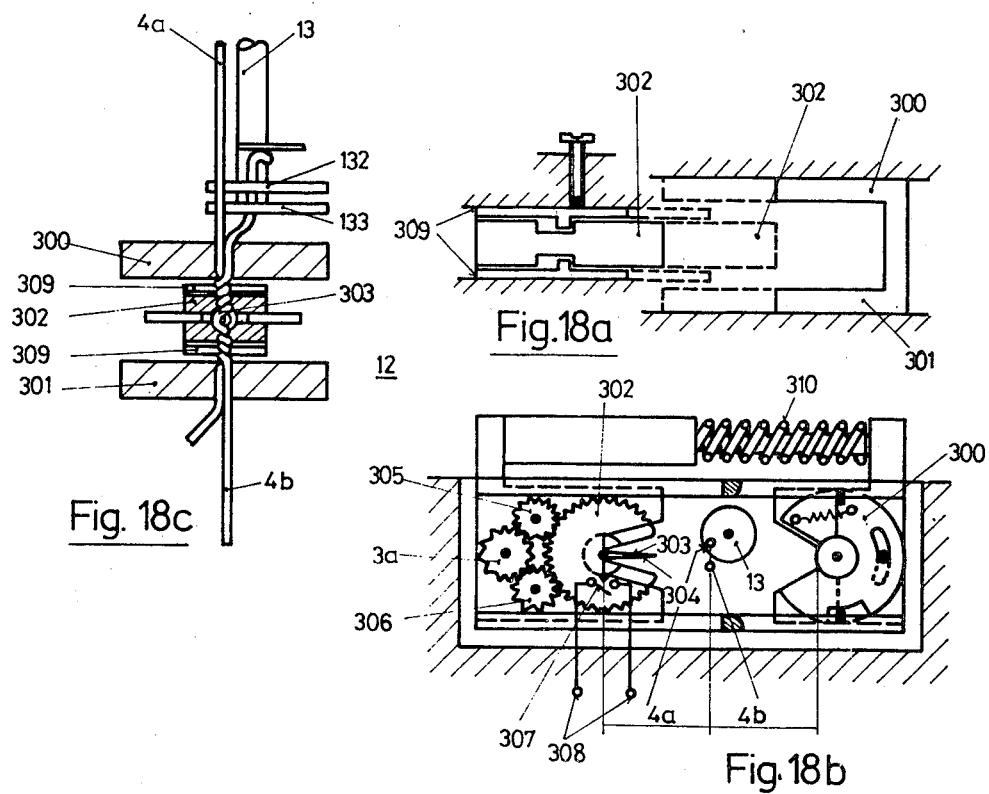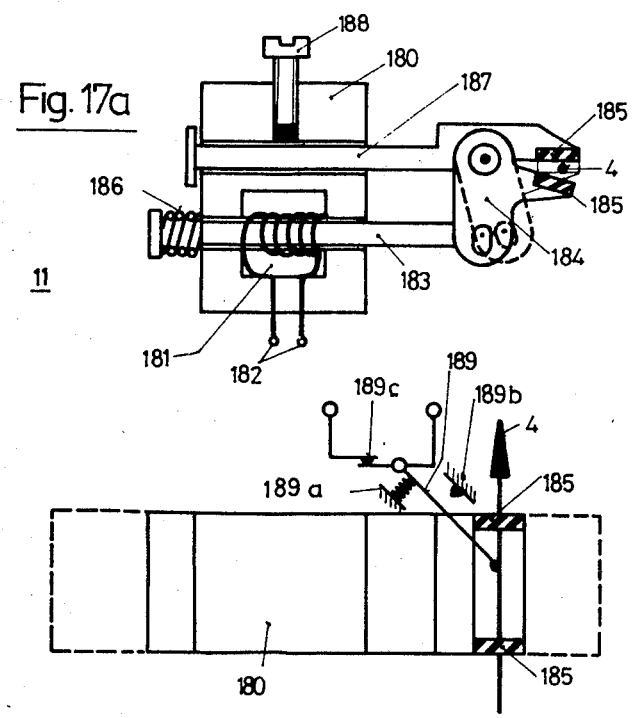

AUTOMATIC SET-UP ELECTROEROSION MACHINING METHOD AND APPARATUS

This is a division, of application Ser. No. 435,206 filed Jan. 21, 1974, now U.S. Pat. No. 3,891,819.

This invention relates to method and apparatus for electroerosion machining of workpieces by means of filamentary electrodes, with the path of relative movement between the workpiece and the electrode directed by an electronic control system. The term electroerosion as here used includes electric discharge machining (EDM) and electrochemical machining (ECM). The term filamentary electrode includes electrodes in the form of wire or a metal band or tape.

Electroerosion machining equipment for cutting out parts of any desired contour or along any desired path from metallic workpieces, as well as for cutting any desired profile in metallic material, are well known. Wire or tape electrodes with round or polygonal cross section have been used for this purpose in EDM and also in ECM machining workpieces. Such wire or tape electrodes and the workpiece to be machined are moved relatively to each other during the electroerosion machining process. The relative movement between electrodes and workpieces are directed by an electronic control system. This relative movement is sometimes referred to as the path or contour of the operation.

The known equipment can carry out the actual machining process very well. Since both EDM and ECM are being extended into ever wider regions in the various branches of industry, and in many areas of application have displaced the conventional mechanical contact machining of workpieces by cutting, milling, grinding, etc., a demand has arisen to eliminate the uncertainties of human error and handling from EDM and ECM equipment and also from the work operations that are grouped around the machining process itself as peripheral processes. Expressed in other words, this means that the operator for one or more of such EDM or ECM machining equipments should be freed from any necessity of performing by hand the many manipulations involved. Manipulations by operators working at the machining equipment are known to be accompanied by imponderable and unpredictable factors, so that they frequently reduce the usability of the equipment through human error.

It is an object of the present invention to take away from the sphere of activity of the machine operator a portion of the processes that are grouped about the actual EDM or ECM processes for machining workpieces. These auxiliary processes may be designated as follows:

Loading and unloading the workpiece and the tool into and from the machine;
Making of starting bores in the workpiece with auxiliary equipment;
Orienting and positioning in the machine the workpiece clamped in its holder;
Threading the filamentary tool in the starting bore of the workpiece;
Securing the core to be cut out by the tool during or shortly before the completion of EDM or ECM processing.

It is an object of the invention to avoid or mitigate human manipulation necessary for the threading of the tool in the starting bore of the workpiece or for securing the core to be cut out by the tool during or shortly before the completion of EDM or ECM processing.

A further object of the invention is to enable the capacity of one or more machining equipments to be used more effectively during machine operating time. This is of great significance, particularly for mass production.

As a preface to the explanation of the present invention, it should be observed that when a wire or metal tape electrode is used in EDM or ECM, the wire is continuously renewed at a suitable rate so that its erosion during machining will not proceed to the point where the wire or metal tape will break. Renewing the electrode in this fashion has the advantage that removal of the wire before it has been very much eroded also preserves the accuracy of machining. The machining equipment accordingly has an operating zone which includes the portion of the wire that participates in the electroerosion process, in the neighborhood of the workpiece, and, on one side of the operating zone and of the workpiece, a supply side of the equipment for supplying fresh electrode wire or tape and, on the other side of the operating zone and of the workpiece, a take-up side of the equipment for taking the spent wire or taped electrode out of the operating zone and transferring it to a take-up device or a disposal device. The reference to the electrode supply side of the apparatus and to the electrode take-up side of the apparatus accordingly means, respectively, the portion of the apparatus on the electrode supply side of the operating zone and of the workpiece and the portion of the apparatus on the electrode take-up side of the operating zone and of the workpiece. These expressions refer particularly to the portions of the apparatus holding and moving the electrode that operates as a tool in the machining process.

SUBJECT MATTER OF THE PRESENT INVENTION:

Briefly, an electrode drive and guiding system is provided having certain equipment at the electrode supply side of the electrode operating zone and certain equipment at the electrode take-up side thereof, as follows:

an electrode dispensing means is provided on the electrode supply side of the electrode drive and guiding system;

on both the supply side and the take-up side of that system there are provided a transport mechanism and guiding means for transporting and guiding the electrode, respectively, and also an electrical current connection for applying a voltage to the electrode;

on either the supply side or the take-up side there is provided a device for pushing or pulling the end of the electrode wire or tape through at least a part of the operating zone right to the transport mechanism of the take-up side.

For pushing the electrode into the starting bore, a flow of a pressure medium around the electrode may be used. For pulling the electrode, a grasping member may be used, as further set forth with reference to the drawings. Such pulling may begin when the end of the electrode emerges from the bore in the workpiece or, with a suitable grasping member, it may begin with the entrance of the electrode into the operating zone and pull the electrode wire through the bore as well as all the way to the transport mechanism on the take-up side.

For repeated use through a bore in the workpiece, means are provided for cutting the electrode, removing the portion passing through the workpiece while holding the other, repositioning the workpiece to present a new bore, threading the electrode through the new bore and then connecting the piece connected with the take-up mechanism with the piece connected with the supply side of the equipment. The connecting device in one form aligns the two ends in adjacent overlap, puts a sharp point between and twists the two ends together, after which the twisted portion is stripped from the point member. Other forms are also described.

The invention is described by way of example with reference to the accompanying drawings, wherein:

FIG. 7 is a diagrammatic plan view of a transport mechanism for either the supply side or the take-up side of the electrode drive and guiding system;

FIG. 8 is a cross-sectional view through the axes of opposed rollers of the transport mechanism of FIG. 7;

FIG. 9a is a diagram, partly in cross-section, illustrating the grapple member for threading the electrode;

FIG. 9b is a detailed plan view of grasping means of the grapple member of FIG. 9a;

Figure 15A:
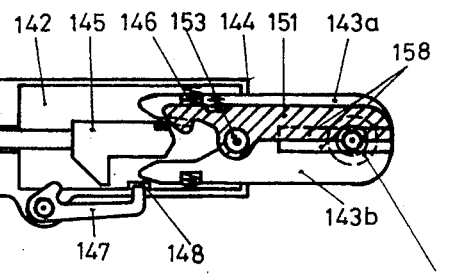
Figure 21B:
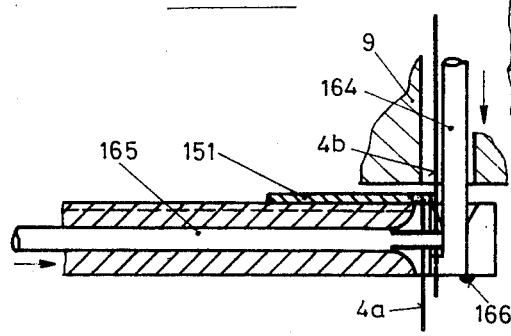
Figure 15B:
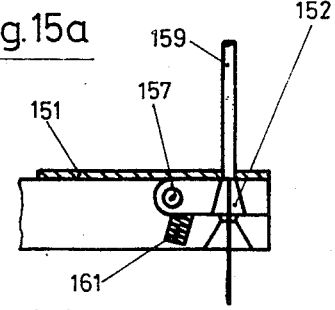
Figure 21C:
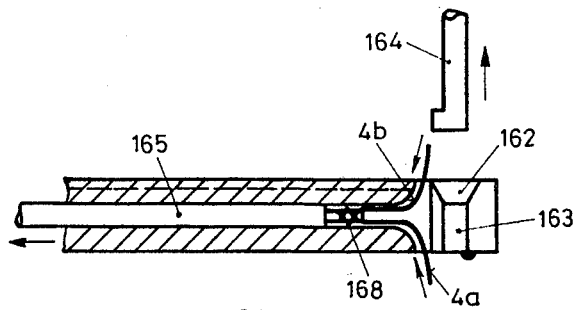
Figure 15C:
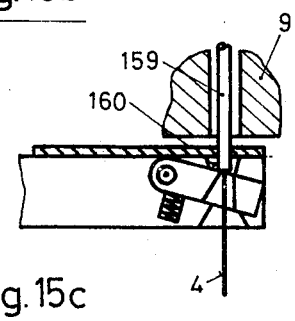
Figure 21D:
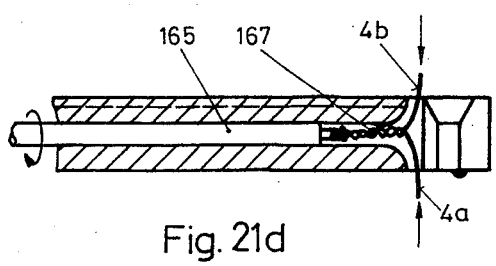
Figure 19A:
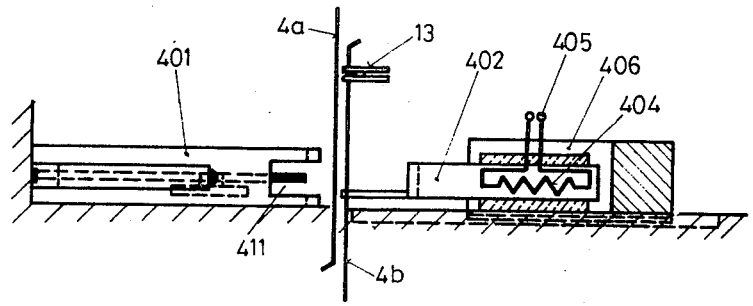
Figure 19B:
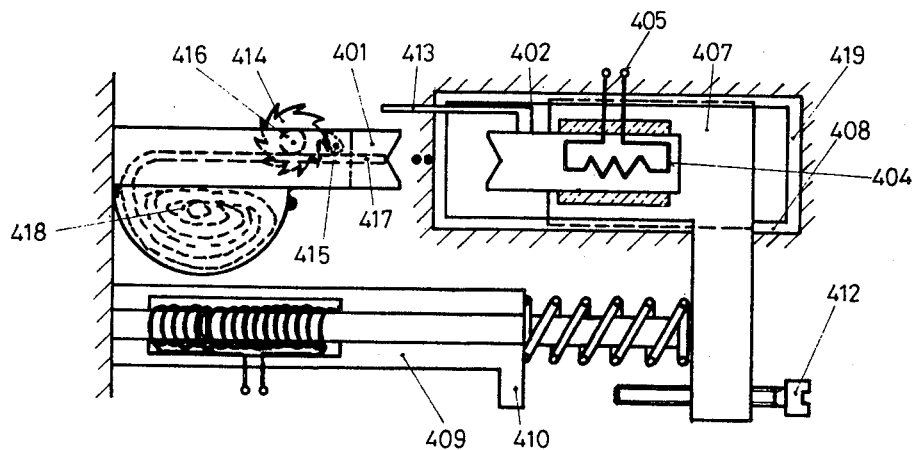
Figure 19C:
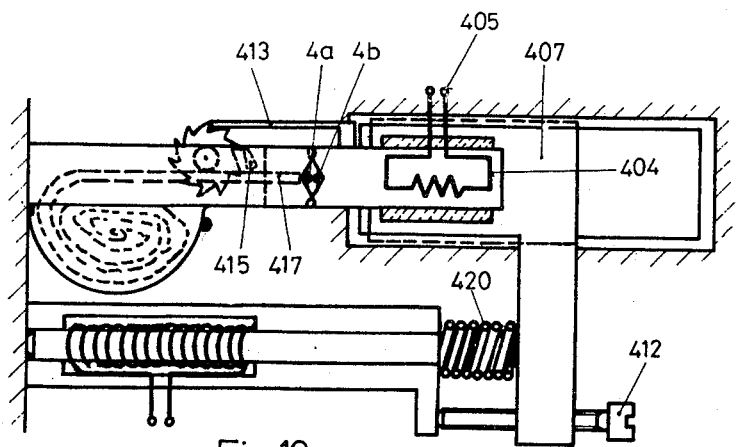
Figure 20A:
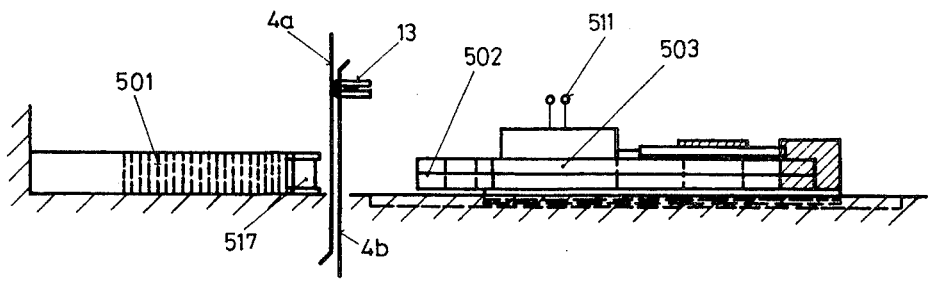
Figure 20B:
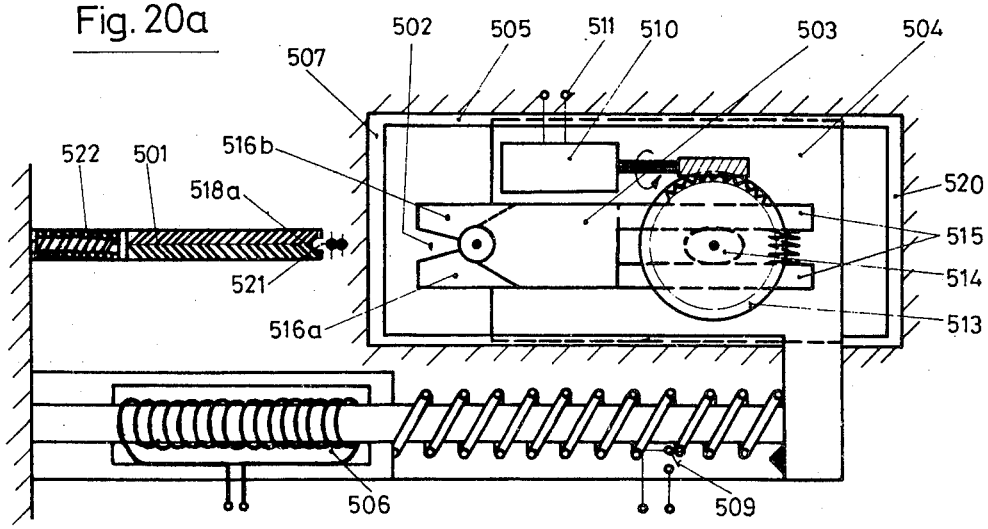
Figure 20C:
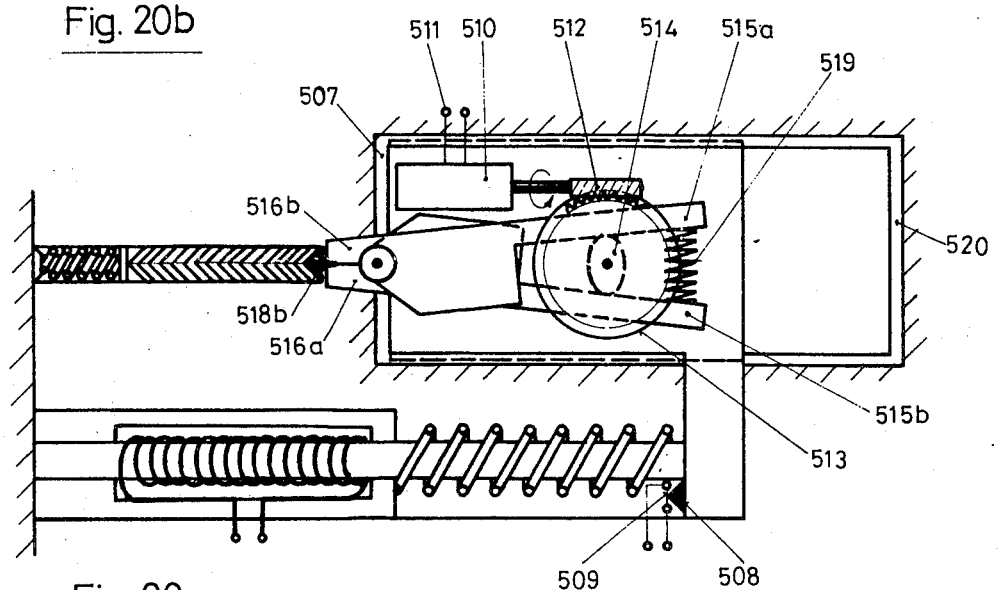
Figure 22A:
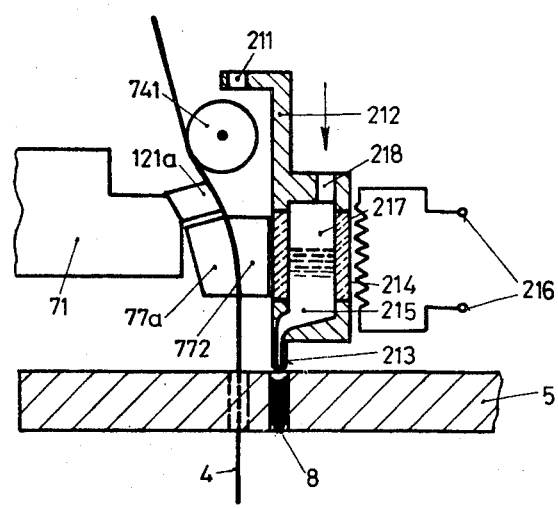
Figure 22B:
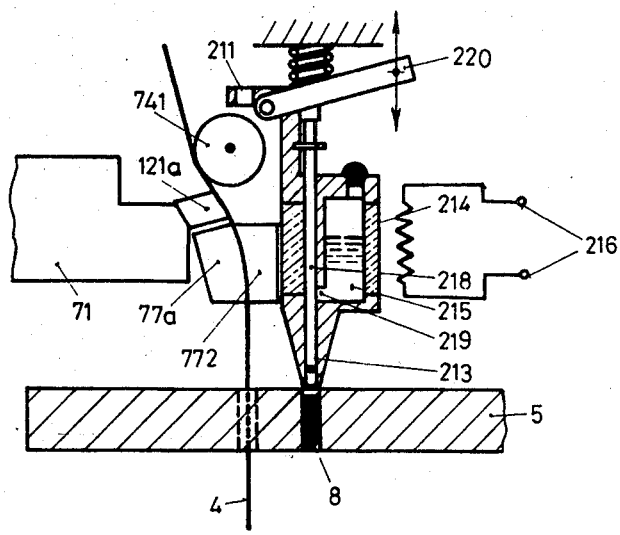

FIGS. 10, 11, 12a, 12b, 13a and 13b, which appear on the same sheet as FIGS. 7 and 8, show various other kinds of grasping means for grapple members for use in an electrode drive and guiding system according to the invention, FIGS. 10, 11, 12a and 13a being elevation views partly in section and FIGS. 12b and 13b being end views of the grasping means shown respectively in FIGS. 12a and 13a;

FIGS. 14a, 14b, 14c, show different positions, in plan view, of means for holding an electrode wire or tape fast;

FIG. 14b is a plan view of means for both holding fast and for cutting a wire or tape electrode;

FIG. 14e is a cross-sectional view of a portion of the device of FIG. 14b;

FIG. 15a is a plan view, and FIGS. 15b and 15c are cross-sectional views in different positions of operation, of another form of device for holding and cutting electrode wire or tape in accordance with the invention;

FIG. 16a, 16b, 16c and 16d, which appear on the same sheet as the various subdivisions of FIG. 14, are diagrammatic views showing different ways of actuating electrode holding means or electrode holding and cutting means;

FIG. 17a is a plan view of still another form of means for holding a wire or tape electrode;

FIG. 17b is a diagram illustrating the manner of operation of the device of FIG. 17a;

FIGS. 18a and 18b are plan and elevation views, respectively, partly in cross-section, of means for connecting together the ends of electrode wire or tape to be connected;

FIG. 18c is a detailed elevation view, partly in cross-section, illustrating the manner of operation of the device of FIGS. 18a and 18b;

FIGS. 19a and 19b are an elevation view and a plan view, respectively of another form of device for connecting together ends of electrode wire or tape;

FIG. 19c is a plan view showing the device of FIG. 19b in a different position of operation;

FIGS. 20a, 20b and 20c are views corresponding to FIGS. 19a, 19b and 19c of still another form of device for joining ends of electrode wire or tape;

FIGS. 21a, 21b, 21c and 21d, which appear on the same sheet with FIGS. 15a, 15b and 15c, are, respectively, a plan view and elevations views partly in cross-section for three different positions of operation of a combination device for holding, cutting and connecting of electrode wires or tapes; and FIGS. 22a and 22b are cross-sectional views in two different positions of operation, respectively, of a device for securing or temporarily holding a core cut-out of a workpiece.

Figure 1:
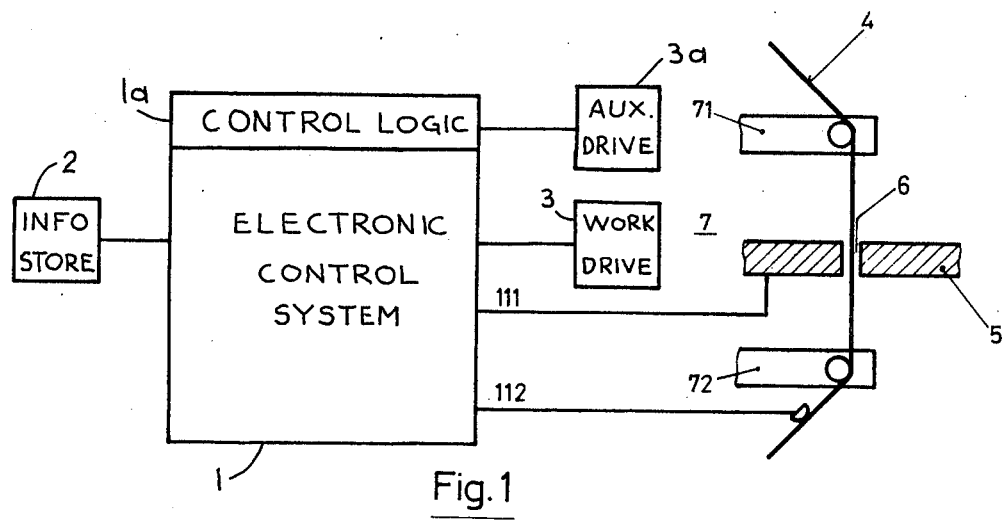
FIG. 1 is a diagrammatic representation of an electroerosion machining equipment including an electronic control system.

FIG. 1 shows, diagrammatically, an electronic control system 1 for directing the relative movement of the wire or tape electrode 4 and the workpiece 5. Such an electronic control system 1 is described in detail in Swiss Pat. Nos. 513,694, 513,693 and 521,815, and in the corresponding U.S. Pat. Nos. 3,713,043; 3,713,044 and 3,713,045, so that now only important points will be referred to for purposes of explanation.

An information carrier 2, which, for example, may be a punched tape, a punched card or a deck of punched cards, a magnetic tape, or the like, contains the necessary information to define the relative movement between the electrode core and the workpiece 5 and for the necessary operation parameters such as, for example, surface roughness, cutting speed, wire running speed, flushing flow and the voltage, current and repetition frequency of the machining pulses (for EDM for example), and so on. The information carrier 2 also carries the data necessary for the control of the process, grouped about the requirements and parameters of the conditions peculiar to the particular EDM or ECM process used for machining the workpiece.

All of these data are provided to the electronic control system 1. They are there evaluated and furnished either to the work advance motor system 3 or over the control logic 1a to the drive motor system 3a. The drive motor system 3a symbolically represents the drives that are necessary for carrying out the auxiliary or peripheral operations that surround or assist the actual machining operation. The motors of this drive motor system can be mounted either on the work advance head of the apparatus which carries the electrode drive and guiding system 7, or else on auxiliary apparatus not shown in the drawing. This will be more particularly described in connection with the other figures of the drawing.

The work advance motor system 3, which is shown only symbolically in FIG. 1 for simplicity, comprises motors dealing with the machining operation itself. These work advance motors of the system 3 move the workpiece 5 and/or the electrode system 7 relative to each other during the machining operation. The workpiece 5 is clamped by means not shown on a workpiece table or mount (likewise not shown). These also will be described more particularly in connection with other figures of the drawing.

In addition to controlling the motors above-mentioned, the control system 1, on the basis of corresponding input from the information carrier 2, provides the necessary operation parameters, such as, for example, voltage, current or pulses to the connections 111 and 112 so that electric discharge or electrochemical machining can be properly carried out in the working gap 6 between the electrode 4 and the workpiece 5. The motors of the work advance system 3 move the electrode system 7 and the positioning table for the workpiece 5 relative to each other by an amount corresponding to the progress of the machining, and in so doing, follow the desired contour or cutting path. Such paths 8 are shown in FIGS. 2a and 2b.

The electrode 4 is held under tension between the two holding arms 71 and 72. As shown in FIG. 1, one of these arms is intended to represent symbolically the supply side of the electrode drive and guiding system and the other the take-up side. As is known, a large supply of electrode wire or tape is necessary, because the electrode is continuously transported from the supply side to the take-up side during machining. The velocity of electrode transport is adjusted through the electrode attrition during the EDM or ECM operation. The work advance apparatus will be described in further detail in connection with FIGS. 3, 4, 5 and 6. In that description the apparatus will be designated as a drive system and a guiding system to differentiate it from the known work advance apparatus.

Figure 2A:
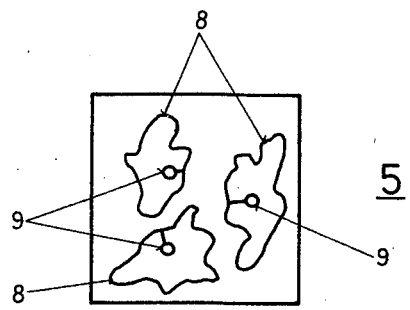
FIG. 2a is a plan view of a workpiece of the kind shown in FIG. 1.
Figure 2B:
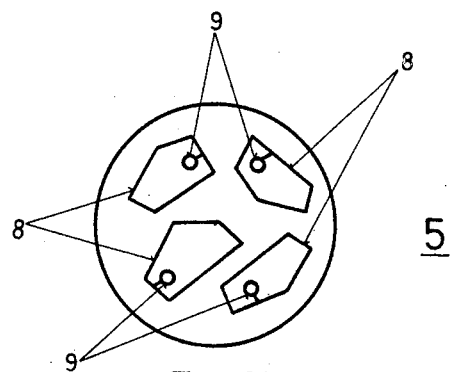
FIG. 2b is a plan view of another kind of workpiece represented in FIG. 1.

It may now be assumed that one or more workpieces 5, according to FIG. 2a or according to FIG. 2b, are to be machined by means of a filamentary electrode 4, for example, an electrode in the form of a wire. It will further be assumed that the machine is first loaded with workpieces and tools (electrodes). The loading information, transferred from the information carrier 2 to the control logic 1a, directs one or more auxiliary drive motors of the system 3a, these motors being disposed adjacent to loading apparatus (not shown in the drawing) for loading the machining equipment with a selected electrode tool or a desired workpiece, as the case may be. Such loading apparatus is well known. The tools and the workpieces are brought into their respective types of magazines (the one for the tools may more or less appropriately be referred to as a crib) and are selectively transported from their respective magazines to the machine. It should be mentioned here also that the machining equipment can correspondingly be unloaded; that is, otherwise expressed, workpieces and tools are transported back from the machining equipment to the respective magazines.

When the equipment is furnished with tool and workpiece, it may be necessary to begin by producing for one or more starting bores 9 for one or more cutting paths 8 (FIGS. 2a and 2b) which are to be cut in a single workpiece. For this purpose known auxiliary apparatus is used to position the location of the starting bores 9 at the right places. It is obviously possible to bore the starting bores on the EDM or ECM equipment itself. In this case, the corresponding information from the information carrier 2 is processed in the control system 1, drawing upon the control logic 1a. The workpiece clamped in place in the machine must, however, be previously positioned. This operation step will now be described in detail:

In conventional practice, the operator heretofore had to position the workpiece or workpieces, of the type of FIG. 2a or of that of FIG. 2b, with exacting and time-consuming detail work using measuring dials. The precise coordinate systems of the machining apparatus itself and of the workpiece itself, respectively, had to be brought into mutual coincidence since the data provided by the information carrier 2 is valid only for the coordinate system of the machine. Manual positioning of workpieces is now no longer necessary, as explained below. The necessary information, obtained from the information carrier 2 by a program command signifying "positioning of the workpiece" is simply transferred to temporary storage in the control logic 1a. The wire electrode 4 and the workpiece 5, the latter locked in its holder and located only roughly in position in the machine, receive a voltage over the connections 111 and 112. The directional drive motors of the work advance system 3 move the electrode system 7 and with it the wire electrode 4 in the direction of the outer surface of the workpiece 5 until the two make contact. A signal is thereby produced that is then stored in the control logic 1a. The coordinates of this point of contact between the wire electrode 4 and the workpiece 5 are calculated in the control system 1 and likewise stored. The wire electrode 4 is now moved further along the surface of the workpiece 5 and probes the outer surface in small steps. Each time that there is contact between the workpiece and the wire electrode, the resulting signal is stored in the control logic 1a and evaluated in the control system 1. On the basis of the probed points, an equation for a straight line is calculated in the control system 1. From this straight line equation, and its comparison with the fixed coordinate system of the machine, are computed the necessary angle of rotation and translational displacement necessary to bring the coordinate systems of the machine and of the workpiece into congruence. The angle $\alpha$ and the translational displacement p are calculated in the control system 1, in connection with the control logic 1a, with the result that for the purpose of EDM or ECM machining, as the case may be, beginning at a later point in time, all the data from the information carrier 2 for the cutting path 8 is transformed into terms referring to the coordinate system of the workpiece. If this is done it is not necessary to move the workpiece into a precise standard position, so long as the workpiece is placed in a reasonably approximate position.

If a workpiece 5 of the form of FIG. 2b is set in the machine, truing up of the workpiece is carried out in similar probing steps performed by the wire electrode 4, and, again, the truing up may be done by ordering a modification of the control data rather than by actually producing a further movement of the workpiece. In this case, the wire electrode is moved along the outer surface of the workpiece 5 (FIG. 2b) both in the x-coordinate and in the y-coordinate. With each contact there is produced an evaluation in the control system 1 of the coordinates of the wire electrode. In this case the sign of the increments in the x and y coordinates are to be taken account of. From these values the translational offset p between the coordinate systems of the machine itself and of the workpiece is calculated and stored. During the later machining by EDM or ECM of the round workpiece 5 of FIG. 2b, the transformation of the data from the information carrier 2 to relate it to the coordinate system of the workpiece is automatically carried out.

With the same probing method it is also possible to center exactly apertures or cavities already present in the workpiece 5. There are cases in which a workpiece 5, of a shpae that is not necessarily regular, already has cavities or bores. It may be desired to cut further contours 8 with the wire electrode 4 in such a workpiece 5. A certain geometric relation would of course have to be defined between the cavities present and the additional contours 8 to be provided. In such a case, the wire electrode will probe the reference cavities or other reference features thus defined. As already described, for every probe signal, i.e., for every contact between the wire electrode 4 and the workpiece 5, there will be a calculation of the coordinates of these contact points in the control system 1. In the later machining of the workpiece 5 by EDM or ECM, the data from the information carrier 2 for the paths 8 will be transformed so that the particular geometric relation between the reference cavity or feature and the desired workpiece contours 8 will be maintained. After the orientation and position of the workpiece 5 on the machining table has been ascertained, the positioning of the one or more starting points or starting bores 9 for the paths 8 is carried out by relative movement between the wire electrode 4 and the workpiece 5. The paths 8 can be so disposed that the starting bores 9 can be located either within the workpiece 5, as shown in FIGS. 2a and 2b, or else at the outer surface of the workpiece. In the latter case, the term starting point, rather than starting bore, is used. In both cases there is a fixed geometrical relation of the contour or path 8 to be cut to the outer surface of the workpiece 5. It is therefore necessary to determine exactly the location of the starting bore or of the starting point 9 for each contour or path 8. In the case of the rectangular workpiece of FIG. 2a this is carried out in the following manner: Between the wire electrode 4 and the workpiece 5, as shown in FIG. 1, a voltage is applied over the connections 111 and 112. This voltage has a smaller value than the normal operating voltage during EDM or ECM operation. By utilizing a smaller voltage it is assured that when contacts are made and broken between the wire electrode 4 and the workpiece 5, no damage will be suffered by either part. The electrode advance apparatus 7 and the wire electrode 4, stretched between the arms 71 and 72, are by definition located outside the surfaces of the workpiece 5. The motors of the system 3 move the wire electrode 4 stepwise in the direction of whatever outer surface of the workpiece 5 may be at hand, and in one of the coordinate directions, for example, in the direction of the $x$-coordinate. The directional drive motors of the system 3 can be operated stepwise either through the control system 1, with reference to the control logic 1a, or by hand. If the control system 1 activates step motors for this purpose, there is loaded into the control logic 1a the corresponding programing information which may be conveniently arranged to respond to the command identified as "positioning of the starting bore or start point for the cutting path." The signal that effects this command starts an operation in which the directional drive motors of the system 3 move the wire electrode 4 on the basis of data present in the information carrier 2 relating to the paths or contours 8, which are to be cut into the workpiece 5. The wire electrode 4, moving toward any particular surface of the workpiece 5, then touches the outer surface at any particular point and thereby produces a contact signal, which is stored in the control logic 1a, and then evaluated in the control system 1, after which the wire electrode 4 draws back from the surface of the workpiece 5 and after one or two steps then moves parallel to the outer surface of the workpiece. The wire electrode thereafter again moves in the direction of the outer surface until another contact is made. The steps from one contact to the next are, as already mentioned, stored in the control logic and evaluated in the control system. The wire electrode 4 is subsequently guided a few more times in a parallel path along the outer surface of the workpiece 5, making a few more contacts at spaced points on the outer surface of the workpiece. After the outer surface has been probed a number of times by the wire electrode, the wire electrode is brought back to its point of beginning by a path parallel to the outer surface of the workpiece 5 that was just probed. By this procedure, one axis of the coordinate system of the workpiece itself is determined. The other axis of the same coordinate system is already known in the control system 1. The drive motors of the system 3 move the wire electrode along the other coordinate axes or along the other outer surfaces of the workpiece 5 (assumed to be in the form of FIG. 2a).

From the information for the starting bore 9 obtained from the information carrier 2 and placed in the control system 1, the command signal is developed which causes the wire electrode 4 to travel for a certain distance parallel to the other outer surface of the workpiece 5. After the wire electrode has travelled a particular distance in this direction, it moves perpendicular to this other outer surface of the workpiece 5 until a contact is made. It will now be assumed that exactly at this place at which the wire electrode 4 touches the other outer surface of the workpiece 5 of the form of FIG. 2a, the starting point 9 for the contour or path 8 is located which is to be cut. In this case the normal machining operation could now begin.

Before this machining operation is further described, however, it will be explained how the location or position of one or more starting bores 9 is determined, if these starting bores, exactly as shown in FIG. 2a, are located inside the workpiece 5 and not at one of the peripheral surfaces. The probing operation of the wire electrode 4 of the two edge surfaces of the rectangular workpiece 5 of FIG. 2a takes place exactly as already described. If now the wire electrode 4 approaches the second edge surface of the workpiece 5 to a point of contact, it does not remain at the place of contact, but is instead moved further, in accordance with the data regarding the starting bore 9 evaluated in the control system 1. The wire electrode is moved further against a workpiece until the normal axis of the electrode 4, determined by its guides on the arms 71 and 72, coincides with the axes of the starting bore 9. In this case it is taken into account that the wire electrode will break. This is not critical, since the wire electrode 4 is then reconnected, as will be more particularly described later in connection with FIGS. 4, 5 and 6.

It will now be explained how the position of the starting bores 9 in a workpiece with a circular periphery, as in FIG. 2b, is determined. A voltage is applied to the wire electrode 4 and to the round workpiece 5, over the connections 111 and 112 shown in FIG. 1. The wire electrode 4 is then driven against the outer surface of the workpiece 5 by drive motors of the system 3. As soon as a contact takes place, the evaluation of the contact signal is carried out, as already mentioned. Further probe steps then follow in one coordinate direction. The round outer surface of the workpiece 5 of FIG. 2 is probed for at least 90° of its circumference. There is always a sequence of one step of approach of the wire electrode to the peripheral surface of the workpiece in one coordinate direction, and a movement of the wire electrode away from the outer surface in the other coordinate direction. The individual probe steps are evaluated in the control system. With the assistance of such probing, the center of the circular periphery of the workpiece 5 is calculated in the control system 1. The data for the starting bores or staring points 9 and for the paths 8, that are read out of the information carrier 2, now control the drive motors of the system 3. If the starting point 9 of one such path 8 lies on the round outer surface of the workpiece 5 of FIG. 2b, the wire electrode 4 is moved to this point by the drive motors of the system 3, remains there and then begins the actual machining operation for the contour 8. If the starting bore 9 lies inside the workpiece 5, as shown in FIG. 2b, then the electrode drive apparatus 7 moves such a distance into the workpiece 5 until its operating axes reaches the first starting bore 9. Of course, in this case the wire electrode 4 will come apart but as already mentioned, that is not critical, because the wire electrode will be automatically rejoined as will be further explained later.

Before the actual machining operation begins there is still the possibility that at this stage the electrode 4 will be selected. As is known, for various machining operations wire or tape electrodes of circular elliptical or polygonal cross-section may be required. Furthermore, electrodes are needed that have larger or smaller cross-sections and are made of different materials, as for example, copper, steel, brass, aluminum, graphite, etc. The choice of the suitable electrode for a task is determined according to what particular path or contour 8 is to be cut. At the beginning of this description of the sequence of operations, it was already mentioned that the machining equipment is loaded with tools and workpieces with the assistance of a transport apparatus. The specialized magazine or crib was mentioned, in which the tools, such as wire electrodes, are kept. In such a magazine, wire or tape electrodes with various different cross-sections and of various different materials are made available. The proper electrode for the particular machining operation is chosen by a selection apparatus and furnished to the transport apparatus. The choice of the suitable electrode is carried out in accordance with stored data supplied by the information carrier 2 to the control system 1, with the benefit of the applicable control logic from the control logic 1a. The transport apparatus transports the selected electrode to the electrode drive and guiding system 7. At least some of the drive motors of the system 3a of FIG. 1 are provided for the selection and transport apparatus just mentioned.

It may be assumed that a wire electrode of circular cross-section is chosen. The electrode can be one which is wound on a supply reel or on a spool core. It can also be an electrode provided in a wire pack supply from which the wire may be pulled off. In this example, it is to be assumed that this electrode is wound on a supply reel in a length of several hundred meters to several thousand meters. The loading transport apparatus transports the supply reel to the drive and guiding system 7. There the supply reel is mounted on the supply side of the drive and guiding system 7, which will be gone into in more detail at a later point in connection with the description of FIGS. 3, 4, 5 and 6.

Figure 3:
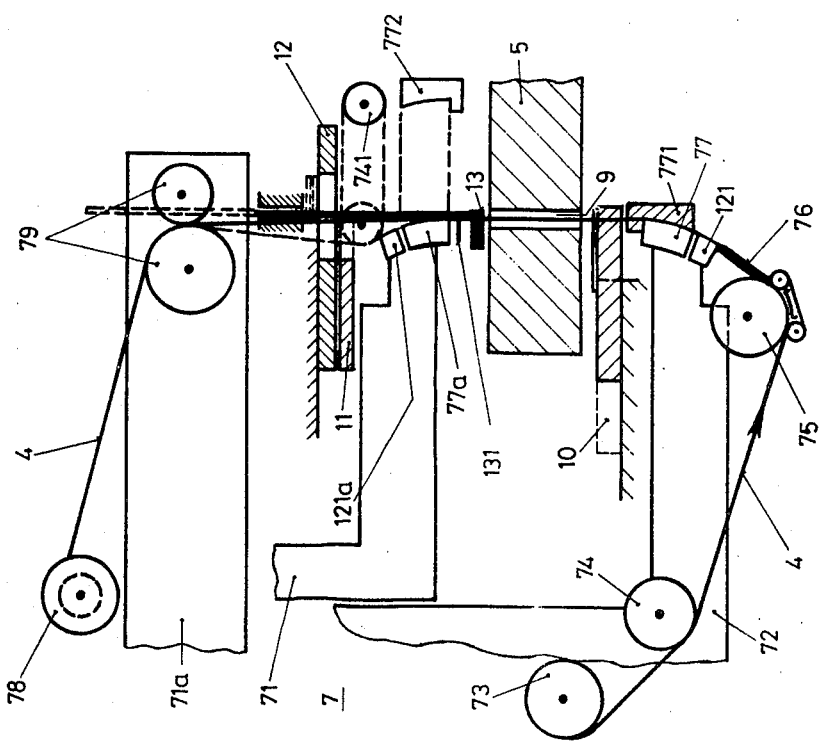
FIG. 3 is a diagram of a first embodiment of an electrode drive and guiding system for electroerosion machining in accordance with the invention.

The threading of the wire electrode 4 in the starting bore 9 will now be explained with reference to FIGS. 3, 4, 5 and 6. FIG. 3 shows the upper arm 71, 71a and the lower arm 72 of the drive and guiding system 7 for the wire electrode 4. In this embodiment, for example, the electrode 4 is in wire form and has a circular cross-section of between 0.01mm to about 1mm. The wire electrode 4 is transported during the actual EDM or ECM machining of the workpiece 5, at a rate related to its attrition, the transport being from the supply side, through the workpiece and to the take-up side. The lower arm 72 shown in FIG. 3 represents the supply side and the upper arm 71a represents the take-up side, symbolically, of the electrode drive and guiding system 7. As already mentioned, the supply of wire electrode on the supply side amounts to between several hundred and several thousand meters. As already mentioned, the selected wire electrode which is wound on the supply reel, was transported from the tool crib to the supply side of the electrode drive and guiding system 7.

The supply reel 73 is shown by way of example in FIG. 3. The wire electrode is led from the supply reel 73 over the guide roll 74 of the transport apparatus 75 mounted on the lower arm 72. The transport apparatus 75, as shown in FIG. 3, advances the wire electrode through the guide tube 76 to the actual wire guide 77. An axial flushing nozzle 771 stands in close contact with the wire guide 77. The axial flushing nozzle has the function of assuring that the wire electrode is surrounded by the flushing fluid during the actual machining. The axial flushing nozzle 771 can also be removed from the wire guide 77.

Between the wire guiding tube 76 and wire guide proper 77, a current lead 121 is provided which electrically connects the connection 112 (FIG. 1) with the wire electrode (FIG. 3). This contact has the function of supplying the necessary voltage to the wire electrode for probing of the position of the mounted workpiece 5 (concordance of the respective coordinate systems of the workpiece and of the machine), determination of the position of the starting point or the starting bore 9 at the edge of or in the interior of the workpiece 5, and also the actual EDM or ECM machining operation. As already mentioned, a smaller voltage than is supplied for the actual machining operation is supplied for probing the position of the mounted workpiece 5 and for determining the position of the starting point or the starting bore 9 on or in the workpiece 5. The workpiece 5 is located between the lower arm 72, i.e., the supply side for the wire electrode, and the upper arm 71, i.e., the take-up side for the wire electrode. Its mounting on its positioning table must accordingly provide for its insertion between these arms. The workpiece 5 is shown broken off in FIG. 3 and the mounting is not shown at all there.

A current lead 121a (which, as in the case of the current lead 121, may be in roller, brush or other form) for connection of the conductor 112 (FIG. 1) with the wire electrode 4 is also provided on the take-up side of the apparatus on the arm 71 (FIG. 3). There is likewise provided on this same arm a wire guide 77 and an axial flushing nozzle 772, the latter being shown in FIG. 3 in its position as withdrawn from the wire guide 77a. In operation, the axial flushing nozzle is located exactly as shown for the nozzle on the supply side of the electrode drive and guiding system 7, i.e., in close contact with the wire guide 77a. The axial flushing nozzle 772 washes down the wire electrode 4 during the actual EDM or ECM machining operation, with an axial flow of the flushing medium, providing a coating of this medium around the electrode, so that the working gap 6 (FIG. 1) between the wire electrode and the workpiece is always filled with the flushing medium.

A further arm 71a carries the transport mechanism 79 for the electrode take-up side of the equipment. Above the electric current supply contact 121a is a guide roller 741, shown in dashed lines in its working position, and in solid lines in its idle position. The wire electrode 4 is led around the guide roller 741 and then led further to the transport mechanism 79. Below the workpiece 5 is a device 10 that is provided for holding and cutting the wire electrode 4. Various different embodiments of this device 10 are further described in connection with FIGS. 14a, 14b, 14c, 14d, 15a, 15b, 15c, 16a, 16b, 16c and 16d. On the take-up side 71 are located the two devices 11 and 12. The device 11 serves for temporarily holding or clamping the wire electrode 4 and will be further described with reference to FIGS. 17a and 18b. The device 12 serves to connect an electrode end with an electrode beginning and is further described with reference to FIGS. 18a, 18b, 18c, 19 and 20. On the take-up side 71 there is also located a grapple member 13 for grasping the beginning of the wire electrode 4 and further transporting it to the transport mechanism 79 of the take-up side of the electrode drive and guiding system 7. The grapple member shown in FIG. 3 is further described with reference to FIGS. 9a and 9b. Other embodiments of the grapple member are shown in FIGS. 10, 11, 12 and 13.

For explanation of the embodiment of the electrode drive and guiding system 7 of FIG. 3, it should now be assumed that the workpiece 5 (FIG. 2a or 2b) is positioned with its first starting bore 9 disposed with respect to the electrode drive and guiding system 7 as shown in FIG. 3. On the take-up side 71, however, it will be assumed that, contrary to the embodiment shown, there is no wire electrode 4. The device 10 for holding and cutting the wire electrode is now in its idle position shown in dashed lines and has no effect whatever on the wire electrode 4 on the supply side 72 of the equipment. The axial flushing nozzles 771 and 722 are in close operating connection with the wire guides 77 and 77a. The holding device 11 and the connecting device 12 for the wire electrode are out of action. As already mentioned, the wire electrode 4 is led from its supply reel 73 over the guide roller 74 into the transport mechanism 75 on the supply side 72.

The control logic 1a provides a control command that sets the drive motors of the auxiliary system 3a (FIG. 1) into motion. These drive motors 3a put into motion the transport mechanisms 75 and 79 of FIG. 3. The transport mechanism 75, which is shown in detail in FIG. 7, is so constructed that a drive motor of the system 3a turns the transport roller 753 over a gear drive 751, 752. Two guide rollers 754 are immediately adjacent the transport roller 753. A plastic or rubber belt 755 is wound around these two guiding rollers 754. This belt, in case of the position of the guide roller 754 as shown in the drawing, presses so hard against the surface of the transport roller 753 that the portion of the wire electrode 4 lying between the transport roller 753 and the belt 755 is driven in the direction shown by the arrow from the guiding roller 74 to the wire guide tube 76. The belt 755 is guided through a spring-pressed sheet metal guide 756. In addition, two more smaller rollers 757 are provided for the belt 755.

The transport mechanism 75 drives the leading end of the wire electrode 4 through the wire guide tube 76, across the electric compact 121, over the wire guide 77, including passage through the axial flushing nozzle 771 to the starting bore 9 of the workpiece 5 (FIG. 3). The leading end of the wire electrode is threaded into the starting bore 9 in this fashion. If the wire electrode has great stiffness, the transport mechanism 75 pushes the leading end of the wire electrode 4 through the wire guide 77a and the axial flushing nozzle 772, across the electrical contact 121a and all the way to the transport mechanism 79 on the take-up side 72. The transport mechanism 79 is further described in FIG. 8. It consists of a drive wheel 79 and a guiding sheel 792. The wire electrode 4 is clamped between layers or coatings 794 and 795 of rubber or synthetic material and is thereby driven on further. By this combination there results a substantially better frictional engagement and, accordingly, a good transport capability for the wire electrode 4, which is grasped by the transport mechanism 79 (FIG. 3) and driven on further. It can be transported over to a take-up reel 78. Instead of the take-up reel, a storage device can be provided which takes up the spent wire electrode. A cutter can also be provided for cutting up the spent wire electrode into small pieces. The various possibilities of taking up or disposing of the wire electrode on the take-up side are further described in Swiss Pat. No. 537,243. In most cases the wire electrode is used only for a single EDM or ECM machining operation.

If a wire electrode with little stiffness is led into the transport mechanism 75 on the supply side of the apparatus, that mechanism drives the leading end of the wire electrode 4, in the previously described manner, as far as the starting bore 9 of the workpiece 5. For this case the grapple member 13 is provided. As shown in FIG. 9a, the grapple member 13 is driven by the drive motor 3a2 over a pinion 138 in engagement with the rod 136, from its position shown in dashed lines, in the direction towards the workpiece 5, until the two grasping arms 132 and 133 are located in the neighborhood of the workpiece surface. This position is shown in FIG. 9a. The drive motor 3a2 is controlled by the control logic 1a.

The leading end of the wire electrode 4 pushed through the starting bore 9 butts against the contact location 131 of the grapple member 13. The electrical signal thereby produced causes the control logic 1a to activate a drive motor 3a1. As shown in FIG. 9a, the drive motor 3a1, operating over the gear drive 137 and rod 136 actuates the grasping arms 132 and 133. As shown in FIG. 9b, the two specially constructed grasping arms 132 and 133 move from the open position designated in dashed lines to the closed position shown in solid lines, moving in the direction shown by the arrow. By this grasping movement of wide scope the wire electrode 4, which is located anywhere within the circle designated by the arrows, is moved to the mid point. The two grasping arms 132 and 133 clamp the wire electrode in the neighborhood of their common fulcrum axis 134. After the wire electrode is clamped the second drive motor 382, shown in FIG. 9a, is activated by the control logic 1a. The grapple member 13 is moved upwards by the drive 138 and the rod 136 to a point where the clamped wire electrode 4 comes into effective engagement with the transport mechanism 79.

In this case, of course, the guide roller 741 and the axial flushing nozzle 722 have been brought into their idle position. The grapple member 13 now releases its grasping arms 132 and 133 in consequence of control of the drive motor 3a1, so that the wire electrode 4 can now be transported further by the transport mechanism 79.

It should be noted that the velocity with which the grapple member 13 is moved in the direction of the transport mechanism 79 corresponds exactly to the effective speed of the transport mechanism 75.

Since now the wire electrode 4 is under tension in the electrode drive and guiding system 7, the actual EDM or ECM machining operation can begin.

The control system 1 process the data from the information carrier 2 and operates the drive motors of the work advance system 3 in the desired way, so that the desired path 8 is followed. The operating path 8 is of course traveled by the electrode relative to the workpiece by taking account of the concordance between the coordinate systems of the machine and of the workpiece and also of the operation parameters. When the machining is finished, i.e. when, as shown in FIG. 2a or 2b the starting bore 9 is again reached, the machining process is switched off by electronic command. The electrode drive and guiding system 7 is then moved to the next starting bore 9 by operation of the control logic 1a in accordance with the data supplied from the information carrier 2. From there on there is a repetition of about the same operations as already described, but with one difference now to be described.

It may now be taken for granted that the first path 8 has been fully traced and cut. Before the control system 1 sets the drive motors of the work advance system 3 into operation in such a manner that the electrode drive and guiding system 7 is moved to the next starting bore 9 of the workpiece 5 according to FIG. 2a or FIG. 2b, the cutting of the wire electrode 4 takes place, while the latter is still in the so-called old starting bore 9. For this purpose the holding and cutting device 10 is driven into operating position. This takes place under control of the control logic 1a. A drive motor 3a shifts the device 10 into its working position for holding and cutting the wire electrode 4. Synchronously therewith the device 11, which as shown in FIG. 3 is in the neighborhood of the arms 71 on the take-up side 71a, moves to its holding position, actuated by a motor 3a in the direction of the wire electrode 4, as commanded by the control logic 1a. The two devices 10 and 11 clamp the wire electrode 4 beneath and above the workpiece 5. In other words, the clamping and holding of the wire electrode takes place both on the supply side 72 and also on the take-up side 71. When that is done, by further operation of the drive motor 3a under control of the control logic 1a the device 10 is actutated to cut the wire electrode below the workpiece 5.

After the cutting of the wire electrode 4, the two devices 10 and 11 release the two portions of the severed wire electrode. The device 10 is more particularly described later with reference to FIGS. 14a, 14b, 14c, 14d, 15a, 15b, 15c, 15d, 16a, 16b, 16c, and 16d. The device 11 is more particularly explained with reference to FIGS. 17a and 17b. It should further be noted at this point that after the release of the wire electrode 4 by the two devices 10 and 11, the end of the wire electrode 4 which belongs to the take-up side 72 is pulled out of the old workpiece contour or starting bore 9 by actuation of the transport mechanism 79, and this goes on until it reaches the level of the devices 11 and 12 of FIG. 3. After that either the workpiece 5 or the electrode drive and guiding system 7 is moved over to the point at which the new starting bore 9 is located in the path of the wire electrode 4, this being accomplished by the drive motors of the system 3, which are controlled by the control system 1. Thereafter the control logic 1a activates a drive motor 3a which sets the transport mechanism 75 into action. The leading end of the wire electrode 4 is now pushed through the new starting bore 9 until it butts against the contact position 131 of the grapple member 13. The grapple member 13 has already been moved by the drive motor 3a2 into the neighborhood of the workpiece 5. The grasping of the leading end of the wire electrode 4 by the grapple 13 now takes place, as has already been described once before. The leading end of the wire electrode is then pulled upwards in the direction of the end of the "old" wire electrode. When now the trailing end of the "old" electrode and the leading end or beginning of the "new" electrode lie parallel to each other, another drive motor 3a, activated by a special control signal from the logic 1a, puts the device 12 into activity which connects the two wires together. This device will be described more particularly with reference to FIGS. 18a, 18b, 18c, 19 and 20. After this connection the EDM or ECM machining operation for the next path 8 can begin. This will be directed by the control system 1 in accordance with the data from the information carrier 2. The threading of the wire electrode into a new starting bore 9 takes place as many times as there are contours 8 provided for cutting in the workpiece 5 of FIG. 2a or 2b.

The threading of a wire or tape electrode 4 into a starting bore 9 of the workpiece 5 has been described with reference to the embodiment illustrated in FIG. 3. For the threading of the electrode 4, it makes no difference whether the electrode is being newly introduced into the electrode drive and guiding system 7 or whether the electrode was previously cut or severed. The electrode is also threaded again if during EDM or ECM machining of a contour 8 in the workpiece 5 it should break apart by some unforeseen chance. In this case a signal will be given to the control logic 1a, which will then cause the "old" end and the "new" beginning of the electrode to be so driven that the electrode can be reconnected together after being set back and repositioned on the starting bore 9.

In the following portion of this description, various further embodiments of the electrode drive and guiding system are explained. The principal differences among the individual embodiments are in whether the electrode wire is cut or otherwise severed on the supply side 72 or on the pick-up side 71, with the electrode being clamped and held on both sides of the workpiece, or, again, as is quite possible, whether the wire electrode is held only on one side and cut there. For the latter case, a combination device 15 has been developed. A still further device between the individual embodiments of the electrode drive and guiding system 7 is involved in the transport of the wire electrode through the starting bore 9. In FIG. 3 the leading end of the electrode 4 is pushed from the supply side 72 to the take-up side 71 through the starting bore. In another embodiment, the electrode is pulled from the supply side 72 to the take-up side 71. In still another embodiment, the electrode is pushed through the starting bore 9 with the assistance of a liquid or gaseous medium.

The grapple member 13 can likewise take various forms, as will later be further explained. The various components that are described with reference to the embodiments of FIG. 3, FIG. 4 FIG. 5 and FIG. 6 can, of course, replace each other in the various combinations.

Figure 4:
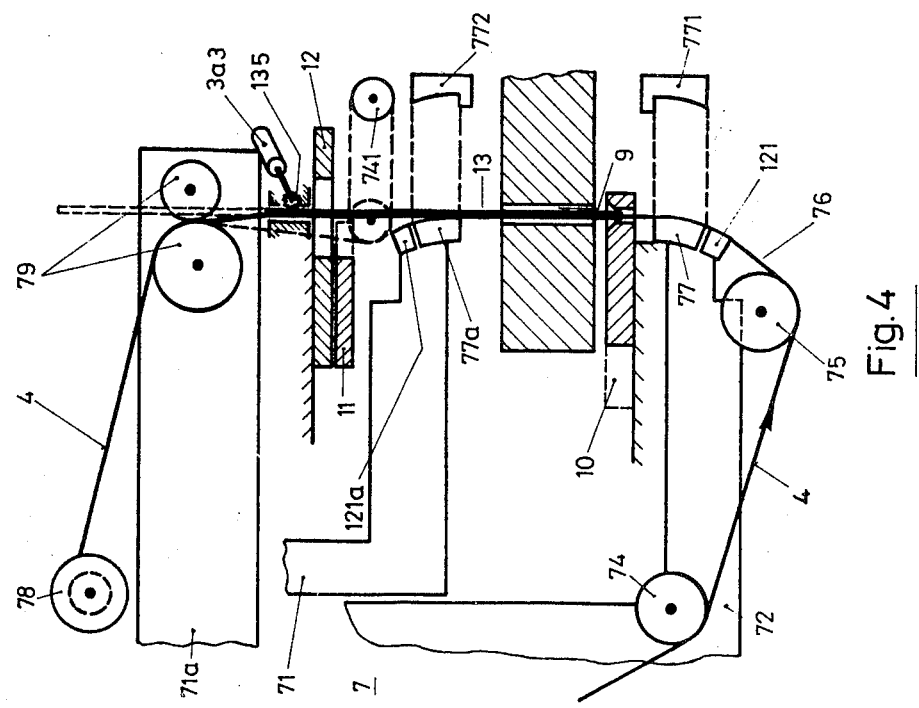
FIG. 4 is a diagram of a second embodiment of such as electrode drive and guiding system.

FIG. 4 shows a second embodiment of the electrode drive and guiding system 7. In this case, the supply side 72 and the take-up side 71 are constructed in the same manner as in the embodiment of FIG. 3. The same components therefore also have the same reference numerals, as in the case of the transport mechanisms 75 and 79, the electrical connections 121 and 121a to the moving wire, the wire guides 77 and 77a, the axial flushing nozzles 771 and 772, the guide roller 741, the holding device 11, the connection device 12 and the guide roller 74. The supply reel 73 is not shown in FIG. 4. This means that the electrode 4 can be supplied in a different manner than wound on a reel.

The electrode 4 is continuously moved from the supply side 72 to the take-up side 71 during the EDM or ECM machining operation. On the take-up side the electrode 4 can as previously mentioned, be taken up or disposed of in various ways. As a symbol of this disposal, a take-up reel 78 is shown.

In the embodiment of FIG. 4 a differently constructed holding and cutting device 10, as well as a differently constructed grapple member 13 is used. This holding and cutting device is shown in FIGS. 15a, 15b and 15c, while this grapple member 13 is shown in FIGS. 10 and 11.

When the wire electrode 4 is transported through the transport mechanism 75 on the supply side 72 in the direction of the workpiece 5, the grapple member 13 moves from the take-up side 71 through the starting bore 9 of the workpiece 5 onto the holding and cutting device 10. A drive motor 3a3 operates the grapple member 13 over the gear drive 135, moving it towards the device 10. On account of the special construction of the cutting and holding device 10, the grasping members 139 (FIG. 10) grasp the wire electrode 4 and pull it through the starting bore 9 over the wire guide 77a and the electrical contact brush 121a up to the transport mechanism 79 of the take-up side 71. The transport mechanism 79 then transports the wire electrode 4 to the take-up. The described operations are carried out with corresponding drive motors 3a directed by the control logic 1a. Of these various drive motors, that also drive the transport mechanisms 75 and 79, the devices 10, 11 and 12 and the grapple member 13, only the drive motor 3a3 for the grapple member 13 is shown in the drawing.

After the wire electrode has been properly tensioned in the electrode drive and guiding system 7, the EDM or ECM machining operation begins. The control system 1 directs the relative movement between the electrode 4 and the workpiece 5 in accordance with the desired contour 8. After the contour 8 has been cut, the wire electrode 4 is severed by the holding and cutting device 10. This takes place in the same way as in the case of the embodiment of FIG. 3. As shown in FIG. 4, the holding and cutting device 10 is brought out of its idle position, shown in dashed lines, into its working position, shown in solid lines. At the same time, the holding device 11 is directed so as to hold the wire electrode on the take-up side 71. After the wire electrode has been cut by the device 10, the transport mechanism 79 transports the trailing end of the "old" wire electrode 4 out of the contour 8 of the workpiece 5 and up to the level of the connection device 12 on the take-up side 71. Thereafter the next starting bore 9 is brought into position for receiving the leading end of the "new" wire electrode 4. This end is held in the holding device 10. Then the grapple member 13 is driven through the new starting bore 9 of the workpiece 5 by the drive motor 3a3 operating through the drive 135 and the grapple member, as previously described, catches the beginning of the wire electrode with its grasping arms 139 (FIG. 10) and pulls the electrode through the starting bore 9 upwards until it reaches the proximity of the end of the "old" electrode. Then the connecting device 12 is put into action to connect the "old" and "new" wire electrodes 4 together, this device being more particularly shown in FIGS. 18a, 18b and 18c. Thereafter the EDM or ECM machining operation can be carried out. For completeness, it should further be said that the described operations are carried out by the control logic 1a acting over the various drive motors of the system 3a. The actual EDM or ECM machining operation is carried out, as already mentioned, by the control system 1 working over the motors of the work advance systems 3. The described threading operation is repeated in the corresponding starting bores 9 of the workpiece 5 as many times as there are still contours 8 to be cut in the workpiece 5.

Figure 5:
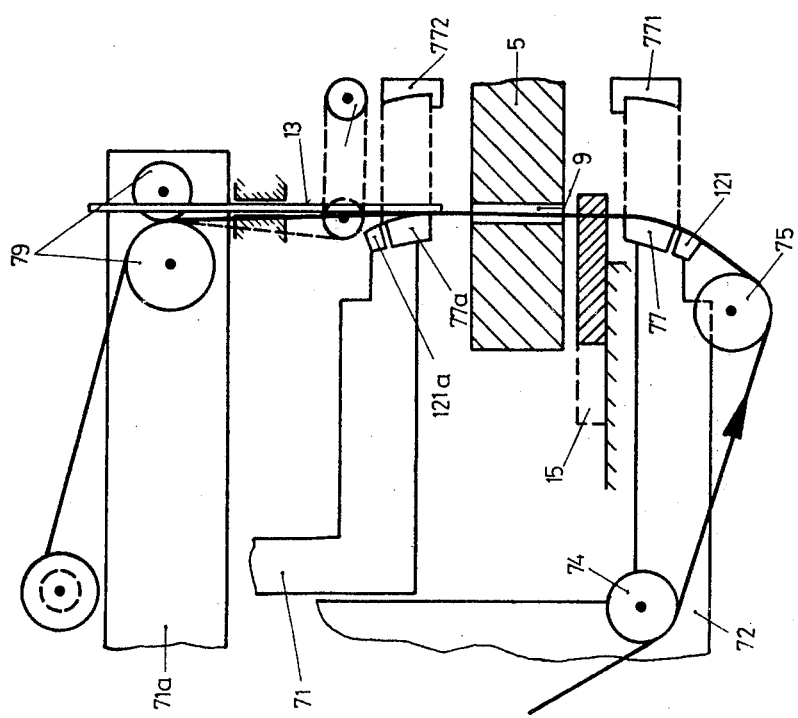
FIG. 5 is a diagram of a third embodiment of such an electrode drive and guiding system.
Figure 21A:
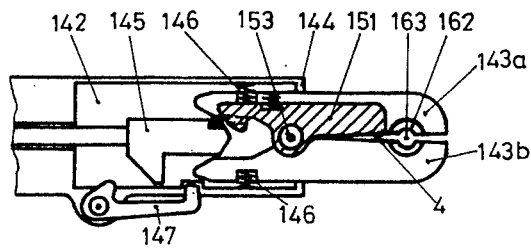

In FIG. 5 a third illustrated embodiment of the electrode drive and guiding system of the invention is shown. In order not to unnecessarily impede FIG. 5, a few components that are the same in the case of all of the embodiments of FIGS. 3, 4, 5 and 6, respectively, have been left out. The components that, although the same, have been included to insure understanding have the same reference numbers as in the other figures when they appear. The embodiment of FIG. 5 is distinguished from those of FIGS. 3 and 4 in that the holding device 11 and the connecting device 12 are not needed on the take-up side 71, while the grapple member 13 is differently constructed. On the unwinding side 72 a combination device 15 for holding, cutting and connecting the wire electrode 4 is provided. When the electrode 4 is threaded into the first starting bore 9, the device 15 is not necessary. It is therefore then located in its position shown by dashed lines. A control signal from the control logic 1a activates a drive motor of the system 3a (FIG. 1) so that the grapple member 13, in this case in the form of tension tongs or pliers (FIGS. 12 and 13) travels through the first starting bore 9 of the workpiece 5 and grasps or catches the leading end of the wire electrode which protrudes somewhat out of the wire guide 77 and then pulls it upwards through the starting bore until the leading end of the wire electrode 4 is placed in the region of the drive mechanism 75 of the take-up side 72. After this engagement is completed, the EDM or ECM machining operation takes place, which is then completed operating under the direction of the control system 1, acting on the motors of the work advance system At this point, it may be assumed that the first contour 8 has already been cut. At this moment the control logic 1a provides an electrical signal to the drive motor of the system 3a that operates the tension tongs 13. The tension tongs 13 are driven into the working position shown in FIG. 5, where they pick up the wire electrode 4. At the same time, the combination device 15 moves out of the idle position shown in dashed lines into the working position shown in full lines, where it holds the wire electrode 4 fast and cuts it. This will be further described with reference to FIGS. 21a, 21b, 21c and 21d.

After this operation, there follows the pulling of the wire electrode through the workpiece 5 by the transport mechanism 79 of the take-up side 72 until the wire end in the lower portion of the tension tongs 13 sets off a stop signal. Then follows the positioning of the next starting bore 9 in the workpiece 5. The tension tongs 13 then push the "old" wire end through the new starting bore 9 of the workpiece 5 into the combination device 15, far enough to bring the "old" and "new" wire electrodes 4 into juxtaposition. The transport mechanism 79 provides the necessary wire advance by turning backwards. In the combination device 15 the two wires are clamped by plier jaws and twisted, so that "old" and "new" wire are fastened together. Upon the occurrence of the following control signal, the tension pliers 13 and the combination device 15 move back to their idle positions. The wire knot is pulled through the starting bore 9 in the workpiece 5 to the take-up side 71 by the transport mechanism 79. The actual EDM or ECM machining operation can begin at this point to cut the new contour 8, which is put into operation by the control system 1, operating through the work advance motors 3. The threading of the wire electrode 4 takes place as often as there are additional contours 8 in the workpiece 5 to be cut.

Figure 6:
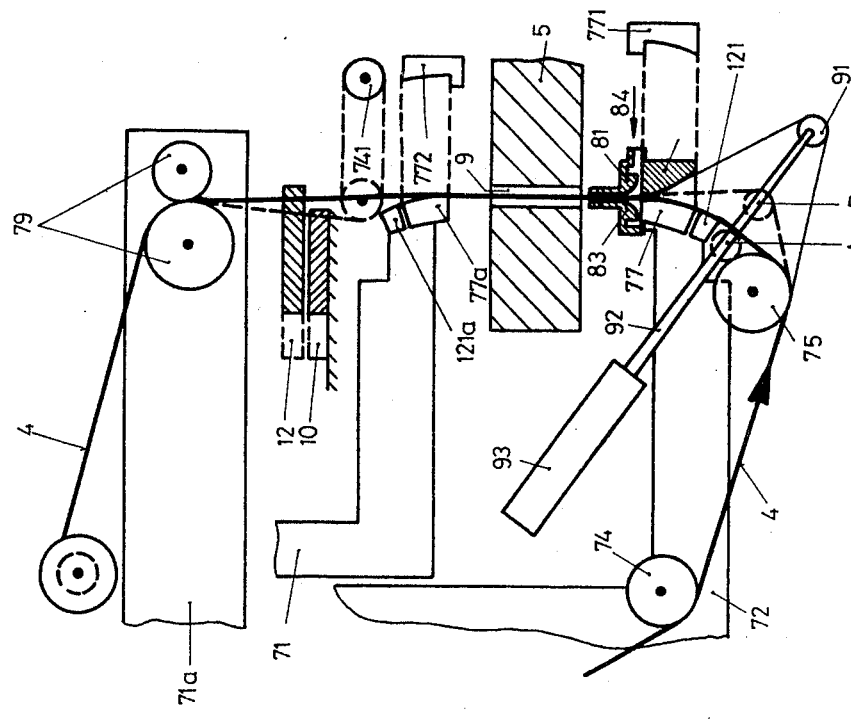
FIG. 6 is a diagram of a fourth embodiment of such an electrode drrive and guiding system.

FIG. 6 shows another modified form of the electrode drive and guiding system 7. The same components have the same reference numbers as in the embodiments described with reference to FIGS. 3, 4 and 5. The essential difference distinguishing the embodiment of FIG. 6 from those previously described is that the holding and cutting device 10 of FIG. 6 is provided on the take-up side and that a threading device 81, 82, 83, 84 is provided to push and guide the wire electrode 4 through the new starting bore 9. A grapple member 13 is not necessary in this case. Furthermore, in FIG. 6 there is a guide wheel 91 for the wire electrode 4 between the transport mechanism 75 and the lower electric current brush 121. The guide wheel 91 is connected with a pressure cylinder 93 for displacement by a movable piston 92. The assembly 91, 92, 93 will be referred to hereafter as the "deflector."

When a first contour 8 is to be cut in the workpiece 5 (FIG. 1), the control system 1 causes the motors of the work advance system 3 to be so operated that the first starting bore 9 is placed in alignment with the electrode drive and guiding system 7, as shown in FIG. 6. The transport mechanism 75 transports the wire electrode 4 over the wire guide 77 into the threading device 81, 82, 83, 84. The guide wheel 91 of the deflector is drawn far back in the direction of the pressure cylinder 93, so that it does not affect the wire electrode 4 at this time.

The beginning of the wire electrode 4 now comes to the component structure 81 of the threading device 81–84. A liquid or gaseous pressure medium is supplied under high pressure to the inlet 84. The structural component 82 of the threading device is so shaped that the pressurized medium is projected in a jet out of the nozzle, the mouth of which, as shown in FIG. 6 is directed along the axis of the starting bore 9. The transport mechanism 75 assures by its action that sufficient wire electrode material is supplied. The wire electrode 4 is practically shot out of the nozzle, right through the starting bore 9 and up to the upper transport mechanism 79. These operations, as mentioned several times before, are controlled by the control logic 1a and put into effect by the corresponding drive motors of the system 3a (FIG. 1).

When the first contour 8 is cut in the workpiece 5 (FIGS. 2a, 2b), the wire electrode 4 is clamped fast by the holding and cutting device 10 (FIGS. 14a, 14b, 14c and 14d), which travels out of its quiescent position shown in dashed lines into its cooperating position, where it not only holds the electrode wire 4 but then cuts it.

The deflector 91, 92, 93 is now actuated in such a way that the piston 92 moves the guide wheel 91 into the position shown in solid lines. The severed wire electrode is thereby pulled through the contour 8 cut into the workpiece 5, so that the severed end of the wire electrode remains in the nozzle structure component 81. The control system 1 then activates the appropriate motors of the work drive 3 to bring the new starting bore 9 of the next contour 8 to be cut in the workpiece 5 into the proper position. The guide wheel 91 of the deflector 91–93 travels back into its initial position. Then the pressure medium is again admitted to the inlet 84 of the threading device 81–84, so that the beginning of the "new" electrode 4 that has been waiting in the nozzle portion 81 is shot through the starting bore 9 and reaches the immediate neighborhood of the end portion of the so-called "old" wire electrode. The connecting device 12 (FIGS. 18a, 18b and 18c) travels out of its quiescent position shown in dashed lines in FIG. 6 into its operating position shown in solid lines and connects the two juxtaposed parallel pieces of the wire electrode. The actual EDM or ECM machining operation can now take place to cut the new contour 8 in the workpiece 5. The operations just described are repeated as many times as there are still contours 8 to be cut in the workpiece 5.

The individual essential components for the electrode drive and guiding system 7 will now be described in the following portion of the specification.

The transport mechanisms 75 and 79 of FIGS. 7 and 8 have already been described in connection with the embodiment of FIG. 3. These transport mechanisms are likewise applicable to the embodiments of FIGS. 4, 5 and 6. Similarly, the grapple member 13 of FIGS. 9a and 9b has already been described in connection with FIG. 3.

The grapple member 13 of FIGS. 10 and 11 was functionally described in connection with the embodiment of FIG. 4. The special construction of the grapple member 13 of FIG. 10 is concerned particularly with the fact that the lower portion of an inner member 139a is provided to form the grasping arms 139. The three or four grasping arms 139 spreading onwards grasp the leading end of the electrode wire 4 by the operation of an outer cone 139b that is displaced against the inner member 139a, so that the grasping arms 139 are pressed hard against the end of the wire electrode 4 and clamp the wire electrode fast.

The grapple member 13 of FIG. 11 likewise consists of an inner member 139a and an outer member 139b. When the grapple 13 of FIG. 11 engages the wire electrode 4 held in the holding and cutting device 10 of FIG. 4, the end of the wire electrode is propelled into a passage 139c, as shown in FIG. 11. The inner part 139a is then so shifted against the outer part 139b that the wire electrode is clamped fast in the passage 139c. The wire electrode, when clamped in the grapple 13 of FIG. 10 or of FIG. 11 is then pulled through the starting bore 9 of the workpiece 5 as shown in FIG. 4. The grapple members shown in FIGS. 10 and 11 are used in connection with the holding and cutting device 10 of FIGS. 15a, 15b and 15c in the embodiment of FIG. 4.

The grapple member 13 of FIGS. 12 and 13 is used in the embodiment of FIG. 5 in connection with the combination device 15 for holding, cutting and connecting the wire electrode. The combination device 15 is described in FIGS. 21a, 21b, 21c and 21d. The grapple member 13 of FIGS. 12 and 13 likewise consists of an inner part 139a and an outer part 139b, the former branching out into two grasping arms 139. The grasping arms 139 of FIG. 12 are broadened at the lower end where the wire electrode 4 is caught. The grasping arms 139 of FIG. 13 do not have such a broadening.

The holding and cutting device 10, used in the embodiments of FIGS. 3 and 6, is shown in FIGS. 14a, 14b, 14c and 14d. FIG. 14a shows, in plan view, the rest position of the device 10. The wire electrode 4 is not affected in this condition. FIG. 14b shows the operating position of the device 10. The pliers 143, mounted on a sliding carriage 142 in the guide 141 are pushed forward until arrested by the stop 144, as the result of a wedge 145 of an actuating system (FIGS. 16a, 16b, 16c 16d) pressing on the two rear heels of the pliers 143 which are urged together against the action of the wedge by the springs 146. When the operating position is reached, the two plier halves have been fully opened. The wire electrode 4 is now in the operating area of the device 10.

Further advance of the wedge 145 on the heels of the pliers close the jaws 143a and 143b of the pliers around the wire electrode 4. At the same time the pawl 147 is freed and it catches in the notch 148 of the carriage 142.

As shown in FIG. 14d the cam 149 provided on the wedge 145, when the latter is advanced all the way to the end stop 150, actuates the knife 151 mounted on the plier arm 143a. The knife swings about the pivot 153, which also serves as the pivot of the two plier halves 143a and 143b. The wire electrode now clamped or held in the bore 152 of the pliers 143 is cut by this movement of the knife 151. The cam 149 in its end position gets to lie between the knife pivot 153 and the knife cam 154, as the result of which the knife returns to its initial quiescent position (FIG. 14c). The bore 152 is then again open and the wire electrode 4 can be pushed (FIG. 3) or pulled (FIG. 6) through the workpiece 5.

After the threading of the wire electrode is complete, i.e. immediately before the beginning of the EDM or ECM operation proper, the holding and cutting device 10 is drawn back to its rest postion as follows: the wedge 145 is drawn back by its drive system (FIGS. 16a, 16b, 16c, 16d), its cam 149 gliding passed the notch 155 in the knife 151. In consequence, the knife 151 does not repeat its cutting motion. When the wedge 145 hits the stop 156, the pliers 143 are opened and the locking by the pawl 147 is released, so that the carriage 142 is fully retracted into its rest position as shown in FIG. 14a.

The holding and cutting device 10 in the embodiment of FIG. 3 is mounted on the supply side directly underneath the workers 5, whereas in the embodiment of FIG. 6 it is mounted directly beneath the wire connecting device 12 (FIGS. 18a, 18b and 18c) on the take-up side 71. The knife 151 in each case is located on the side of the device that faces the workpiece 5.

The holding and cutting device 10 of the embodiment of FIG. 4 will be described more particularly with reference to FIGS. 15a, 15b and 15c. In this case the device 10 is located directly in front of the workpiece 5 on the supply side 72. The knife 151 is on the side of the device facing the workpiece 5. FIGS. 15a, 15b and 15c show the device 10 in its operating position. The manner of operation of this device 10 corresponds to that of FIGS. 14a, 14b, 14c and 14d already described, with the following exceptions: the two plier halves 143a and 143b are each equipped with a centering plate 158 swinging on a pivot 157 and the bore 152 of these centering plates positions the wire electrode 4 at the supply side 72 of its guiding system on the center of the starting bore 9. While FIG. 15a is a plan view of the device 10, the device is shown in a side elevation in FIGS. 16b and 16c for better understanding.

The grapple member 13 of FIGS. 10 and 11 descends down onto the device 10 and thus pushes down the two wire centering plates 158, as shown in FIG. 15b. The grapple member 13 is guided in this operation in the centering cone 160 of the holding pliers 143 (FIG. 15c). The wire electrode 4 is surrounded by the grasping arms 139 as the result of the insertion of the grapple member 13 into the device 10, after which the wire electrode is clamped by relative displacement of the inner piece 139a with respect to the outer piece 139b (FIGS. 10 and 11). The grapple member 13 now pulls the wire electrode upwards through the starting bore 9 of the workpiece 5, while the two wire centering plates 158 move back into their normal positions by the restoring springs 161.

FIGS. 16a, 16b, 16c and 16d show various driving elements for the actuation of the holding and cutting device 10 from its rest position to its operating position and back. These drive elements serve for the operation of the device 10 illustrated in FIGS. 14a, 14b, 14c, 14d, 15a, 15b, 15c and 15d. FIG. 16a shows a piston and cylinder system with alternately admitted and exhausted operating medium, which may be liquid or gaseous. A piston that drives the wedge 145 in the device 10 moves correspondingly in a cylinder 170. The operating medium is activated in response to corresponding control signals from the control logic 1a.

FIG. 16b shows an electromechanical system with a gear drive or a friction wheel drive. The drive motor 3a is operated in one or the other direction with the desired speed by means of a voltage applied to the terminals 172. It displaces the wedge 145 of the device 10 by means of the gear drive 171. The switch 173 switches the voltage at the terminals 172 off after the device 10 has completed its function. The control logic 1a controls the voltage at the terminals 172.

FIG. 16c shows a piston and cylinder system with a single-acting gaseous or liquid working medium flowing in and out, operating with or without a restoring spring. The wedge 145 of the device 10 is moved in one or the other direction in response to corresponding control signals from the control logic 1a.

FIG. 16b shows an electromagnetic drive with a restoring spring. A winding 174 of an electromagnet is excited by a voltage applied to the terminals 172, so that the wedge 145 of the device 10 travels to its operating position. As soon as the voltage at the terminals 172 is switched off, the restoring spring 175 pulls the entire device 10 back into its rest position. The restoring force is adjusted by means of the screw 176. The control logic 1a controls the voltage at the terminals 172 in accordance with the program.

The combination device 15 shown in the embodiment of FIG. 5 will now be described further with reference to FIGS. 21a, 21b, 21c and 21d. These Figures appear on the same sheet as FIGS. 15a, 15b and 15c. This device 15 serves to hold, cut and join the wire electrode 4. The functions of this combination device corresponds in part to that of the holding and cutting device 10 shown in FIGS. 14a, 14b, 14c and 14d. In the case of the combination device 15 of FIGS. 21a–21d, the same holding and cutting components are designated with the same reference numeral as in the case of the device 10 of FIGS. 14a–14d. The working position shown in FIG. 21a for the combination device 15 corresponds to the working position of the device 10 shown in FIG. 14c, with the following exceptions: In the case of the combination device 15 of FIG. 21a the plier halves 143a and 143b of the pliers 143 hold the wire electrode 4 firmly clamped. In front of the knife 151 is the centering cone 162 and the centering bore 163 for the grapple member 13 (FIG. 12). In the lower portion of the pliers 143 a longitudinal bore 168 is arranged in which another grasping member is pushed against the wire electrode 4. The grapple member 13 is constituted as tension pliers in accordance with FIG. 13 and is designated as the tension pliers 164 in FIGS. 21b and 21c.

After the electrode, clamped fast in the pliers 143, has been cut by the knife 151 (in consequence of the movement of the cam 145) and the "old" end 4b has been pulled out of the work piece 5 and a new starting bore 9 has been displaced into position for receiving the "new" beginning 4a of the electrode, the electrode end 4b is pushed down through the new starting bore 9 by means of the grapple member 13 constituted in the form of the tension pliers 164, as shown in FIG. 21b. The tension pliers 164 are centered in the cone 162 and in the bore 163 and are pushed therein until they reach the end stop 166 in the holding pliers 143, at which point the tension pliers 164 position the "old" wire electrode 4b immediately next to the "new" wire electrode 4a. The "new" wire electrode 4a is clamped fast in the upper part of the holding pliers 143.

The second set of tension pliers 165 is then pushed forward by another drive system far enough to grasp the two electrode pieces 4a and 4b. After the second tension pliers 165 have grasped the two electrode pieces, the holding pliers 143 and the grapple member 13 constituted as the tension pliers 164 are both released. As shown in FIG. 21c, the tension pliers 165 pull the two electrode pieces 4a and 4b into the bore 168. The grapple member 164 is withdrawn in the direction of the arrow in FIG. 21c to its rest position. As shown in FIG. 21b the tension pliers 165 rotate the two electrode pieces 4a and 4b through a few revolutions to twist them together. By this twisting shown at 167 the two electrode pieces are firmly locked together. The tension pliers 165 are thereafter released and the wire electrode 4 is pulled further by the transport mechanism 79 of the take-up side 71. The operations described up to now, as already mentioned, are directed by corresponding control signals from the control logic 1a (FIG. 1) and carried out by the force of the corresponding drive motors of the system 3a. The combination device 15 can use a drive system of one of the types shown in FIGS. 16a, 16b, 16c and 16d. The EDM or ECM machining operation proper, which now takes place, is again directed by the control system 1 and carried out with the assistance of the work-advance motors of the system 3.

FIGS. 22a and 22b show a device for affixing the core cut out of the work piece in its original position so that it will not fall out while in the machine. The contour 8 is cut in the work piece 5 by the wire electrode 4 in the course of the EDM or ECM machining operation. The core inside the contour 8 will often tend to be canted during the cutting of the last stretch of the contour. This leads to jamming the wire electrode 4 or to causing short circuits in the machining process. In order to overcome this problem an adhesive is injected into the contour 8 as already cut at a number of places along the contour 8. The adhesive can be either a quick-hardening two-component cement, a microcellulose cement or a metal alloy (Wood metal, Cerro metal or solder). Metal alloys for this purpose must have a very low melting point, e.g. 45°–90° C. The cement materials, which belong to the plastic group, must have additives providing electric conductivity.

The device of FIG. 22a is designed to inject a metal alloy in the cut of the contour 8. The arm 71, as already explained, carries the wire guide 77a with the axial flushing nozzle 772 and also the electrical contact 121a. There is also provided a housing 212 on the arm 71 that is pivoted for rotation about the bearing 211. In this manner the housing 212 can be swung either into a few fixed positions, or without fixed steps, on the cut of the contour. An electric heater winding 214 with connections 216 is provided around the housing 212, by which the metal alloy 215 is liquefied by either inductive or resistive heating. The liquid metal 215 is pressed in squirts through the nozzle 213 onto the cut contour 8 in the work piece 5 by means of a medium 217 under pressure that is admitted to the housing 212 through a valve 218. Since the metal cools quickly, the core inside the contour 8 adheres to the remainder of the work piece 5 and for that reason can no longer become canted. When the contour 8 in the work piece 5 of the form of FIG. 2a or of 2b is completely cut out by the wire electrodes 4, the core is pressed out of the work piece. The adhesive is removed at this stage without any substantial problem. In accordance with FIG. 22b the dosing and injection of the metal 215 into the contour 8 cut into the work piece is operated by a mechanical system in which the piston 218 is withdrawn by a drive system 220 as far as the opening 219 and, after the nozzle 213 has been filled with liquid metal 215, the piston 218 is again pressed down.

The metal alloys or the mixtures of synthetic material used for this purpose should have the property of expanding upon cooling or hardening. The particles of the alloy or mixture are suited to this requirement. In consequence of the expansion of the adhesive in the contour 8 there arises a so-called "clamping effect" that provides the desired stiff holding force between the core and the work piece.

If electrically non-conducting materials are used for adhesion between the core and the work piece, electrically conducting bridges for the cut part of the contour 8 in the work piece must be provided.

FIGS. 17a and 17b show the holding device 11 of the embodiments of FIGS. 3 and 4. This holding device 11 consists of a body 180 in which an electromagnetic winding 181 has been inserted. A voltage is applied to the terminals 182 provided for the winding so that the rod 183, part of which is a solenoid core will close the clamping jaws 185 by means of the lever 184. Between the jaws 185, of course, the wire electrode 4 is located. The closing of the clamping jaws 185 is produced by the voltage at the terminals 182 in response to a control signal from the control logic 1a. As soon as the voltage is removed, the restoring spring 186 takes effect and opens the clamping jaws 185. The rod 187, that is likewise shiftably mounted in the body 180 can be adjustably fixed by the screw 188, so that the holding device 11 can be precisely adjusted for clamping the wire electrode.

FIG. 17b is a side view of the holding device 11, FIG. 17a just described being a top view. From this diagrammatic side view it can be seen that the holding device contains four clamping jaws 185, one pair at the top and one pair at the bottom of the device. A sensor 189 is pressed by the spring 189a against the wire electrode 4. This measuring sensor is provided for the following situation: As already mentioned in connection with the embodiments of FIGS. 3 and 4, after the cutting of the wire electrode the holding device 11 is opened by the holding and cutting device 10. The transport mechanism 79 on the supply side of the electrode drive and guiding system 7 transports the "old" wire electrode out of the work piece 5 and does so until the trailing end of the wire electrode 4 has passed the lower jaws 185 of FIG. 17b. At this moment the spring 189a presses the sensor 189 against the stop 189b so that the contact 189c is opened. The opening of the contact 189c causes the transport mechanism 79 to be stopped.

The connecting device 12 used in the embodiments of FIGS. 3, 4 and 6 will now be further described with reference to FIGS. 18a, 18b and 18c. After the wire electrode 4 is cut or otherwise severed by the holding and cutting device 10 and the end of the "old" wire has been transported by the transport mechanism 79 to the point at which the contact 189c of the holding device 11 (FIG. 17b) stops the transport mechanism 79, and after the beginning of the "new" electrode wire 4 has been pushed or pulled upwards through the "new" starting bore 9 of the work piece 5, until the two wires are disposed parallel to each other and overlap for a certain length, the function of the connecting device 12 begins. In FIGS. 18b and 18c the two parallel pieces 4a and 4b of the electrode wire are shown. The grapple member 13 (FIG. 18c) has clamped the "new" beginning 4b with its grasping arms 132 and 133. Upon the arrival of a signal from the control logic 1a the particular drive motors of the system 3a relating to the connection device 12 are started. The connection device consists of two halves which are shiftable into each other. The first half contains the two pairs of clamping jaws 300 and 301 which are shifted to the left towards the two wires. As soon as the two clamping jaws touch the wires, they clamp the two parallel-disposed wires together. The two wires are thus held fast both above and below. Before the two wires are clamped by the clamping jaws 300 and 301 the wheel 302, which is provided with a cut-out 304 in which a spike 303 is located moves against the two wires 4. The spike 303 strikes between the two juxtaposed parallel wires 4 and penetrates until stopped by the end of the cut-out 304. The cut-out 304 extends practically to the center of rotation of the wheel 302. Only now are the wires clamped by the clamping jaws 300 and 301. The wheel 302 now turns a few times and thereby twists the two wires 4, as shown in FIG. 18c. A drive motor of the system 3a actuates the wheel 302 over the gear-wheels 305 and 306. With each full revolution the contact 307 is opened by a cam associated with the wheel 302. The electrical signals thereby created at the terminals 308 alert the control logic 1a, which after counting a particular number of revolutions of the wheel 302 switches off the drive motor 3a.

Next the left-hand half of the device 12 as shown in FIGS. 18a and 18b is shifted to the left into its discharge position. With this shift of the wheel 302 to the left the spike 303 is also pulled out of the twisted wires 4. This, however, is possible only because a stripping device 309 (FIG. 18a) sheathes the wheel 302 above and below. As soon as the wheel 302 travels to the left out of the operating position shown in dashed lines in FIG. 18a into the rest position shown in full lines there, the spike 303 is moved past the stripper so that the twisted wire 4 is freed from the spike 303. At the same time the two pairs of clamping jaws 300 and 301 open and likewise travel to their rest position, at the right, shown in FIGS. 18a and 18b. The spring 310 serves to hold the two halves of the connection device 12 in its quiescent position.

The connection device 12 can also be made as shown in FIGS. 19a, 19b and 19c. This example of a connecting device involves the soldering of the two wires lying parallel to each other. FIG. 19a is a cross section through this soldering apparatus 12. The "old" wire electrode 4a lies parallel to the "new" wire electrode 4b. The wire electrode 4b is held fast by the grapple member 13. The two wire electrodes are held between the fixed locating member 401 and the soldering "iron" 402. The heated soldering iron 402, like the fixed locating member 401 has a negative wedge engaging shape (broad V notch). It is heated by the heater winding 404, which receives the necessary electrical voltage over the connections 405. Insulation 406 surrounds the heater winding 404.

As shown in FIG. 19b the soldering iron 402 is mounted on the carriage 407 of the connection device 12. This carriage can be moved in the guide-way 408 by the drive system 409 against the fixedly mounted positioning member 401 up to the point permitted by the stop 410.

The manner of operation of this soldering device 12 will now be described with reference to FIGS. 19b and 19c: The carriage 407 is displaced towards the cut-out 411 (FIG. 19a) between the upper and lower wedging surfaces of the positioning member 401. This displacement continues until the two wire ends 4a and 4b are lightly pressed between the positioning member 401 and the soldering iron 402. The desired positioning positioning is set by means of the stop screw 412. Simultaneously with this displacement the ratchet wheel 414 is turned forward one step by the actuating rod 413 affixed to the carriage 407. The ratchet wheel 414 is prevented from turning back by the pawl 415. As the actuating rod 413 moves the ratchet wheel 414 forward one step, the solder wire 417 is unwound by the friction wheel 416 from the supply spool 418 and the needed length of solder is pressed onto the two wires 4a and 4b. Since the soldering iron 402 is already heated up and has heated the two wires 4a and 4b to the necessary soldering temperature, the soldering of the two wires together occurs when the solder wire 417 is brought against the two wires 4a and 4b. After this operation the carriage 407 of the soldering iron 402 is restored to its rest position against the stop 419 by the restoring spring 420. The soldered wire electrode 4 can now be further pulled through the transport mechanism 79 so that the actual EDM or ECM machining operation can now begin.

A still different embodiment of the connection device 12 is shown in FIGS. 20a, 20b and 20c. In this connecting device the pieces 4a and 4b of the wire electrode 4 are clamped together with a metal clip. FIG. 20a is a vertical section through this form of the connection device 12 as it may be utilized in the embodiments of FIGS. 3, 4 and 6, showing the "old" wire electrode 4a and the "new" wire electrode 4b. The portion 4b of the wire electrode is held by the grapple member 13, which can be constituted in any of the forms shown in FIGS. 9a, 9b, 10, 11, 12 and 13.

The two wire pieces 4a and 4b in FIG. 20a are located between the clip magazine 501 and the opening 502 of the clamping pliers 503. As shown in FIG. 20b, the carriage 504 on which the pliers 503 are mounted is displaced in the guideway 505 towards the clip magazine 501 until it hits the stop 507. This displacement is produced by the drive system 506 which is constituted in the form of a solenoid induction coil. The necessary voltage is applied to the terminals of the coil 506 at the command of the control logic 1a.

The mode of operation of the form of the connecting device 12 shown in FIGS. 20b and 20c will now be described. It will be assumed that the opened pliers 503 have been displaced forward as far as permitted by the stop 507. In this end position the normally open contact 509 is closed by the projection 508. In consequence of the closing of this contact the motor 510, supplied with current over the connections 511, drives the gear-wheel 513 over a wormgear 512. The elliptical cam 514 is affixed to the gear-wheel 513, so that when the motor 510 drives the gear through 90° of revolution, the elliptical cam 514 moves from the position shown in FIG. 20b to that shown in FIG. 20c. In so doing, the cam actuates the plier arms 515a and 515b so that the plier opening 502 is closed. The plier jaws 516a and 516b therefore grasp into the cavity 517 of the clip magazine 501 and press the foremost V-shaped metal clip 518a around the two pieces 4a and 4b of the wire electrode 4 which are disposed parallel to each other just in front of the center of the clip magazine. The two wire pieces and the clip are thereby tightly secured together. If the revolution of the gear 513 and likewise of the cam 514 is continued for 90° more, under control of the switching contacts on the plier legs 515, the pliers 503 are re-opened by the closing of the legs by the restoring spring 519. The plier carriage 504 then rides back into its rest position against the stop 520, while the clamped clip 518b, which now has a reduced width, can come out of the magazine opening 521. The next clip 518 is pressed forward by the spring 522 operating on the stored clips and is now ready for the next connection. The transport mechanism 79 on the take-up side 71 (FIGS. 3, 4 and 6) is activated, so that the wire electrode can cut a contour 8 in the work piece 5 by EDM or ECM, as the case may be.

Although the invention has been described with respect to particular embodiments, it will be understood that interchange of features of the several illustrated embodiments and other modifications and variations may be made within the inventive concept.

We claim:

1. Apparatus for electroerosion machining comprising:

dispenser means for holding and dispensing a supply of a filamentary electrode and comprising a supply reel (73) on which said electrode is wound before being dispensed;

means for driving and guiding said filamentary electrode from said dispenser means, through an operating zone to a take-up location, said driving and guiding means including a dispensing transport means (75) and a take-up transport means (79) respectively located on opposite sides of said operating zone and including also guiding devices (77, 771, 77a, 772) for said filamentary electrode;

means on at least one side of said operating zone for applying electric potential to said filamentary electrode;

means for holding a workpiece at least partly in said operating zone in proximity to said filamentary electrode;

electronic machining control means for causing relative movement of said workpiece during application of electroerosion potential across the gap between said filamentary electrode and said workpiece, whereby a predetermined contour may be machined;

means for propelling (13, 81, 82, 83, 84) a free end of said electrode (4) from or across said operating zone until it reaches said transport means (79) of said electrode driving and guiding system (7) on the take-up side of said operating zone, and connection means (12, 15) located at one side of said operating zone for connecting said free end of said electrode advanced from said dispensing means with an end of a separate portion of said electrode held on the take-up side of said operating zone.

2. Apparatus for electroerosion machining comprising:

dispenser means for holding and dispensing a supply of a filamentary electrode and comprising a supply reel (73) on which said electrode is wound before being dispensed, means for driving and guiding said filamentary electrode from said dispenser means, through an operating zone to a take-up location, said driving and guiding means including a dispensing transport means (75) and a take-up transport means (79) respectively located on opposite sides of said operating zone and including also guiding devices (77, 771, 77a, 772) for said filamentary electrode;

means on at least one side of said operating zone for applying electric potential to said filamentary electrode;

means for holding a workpiece at least partly in said operating zone in proximity to said filamentary electrode;

electronic machining control means for causing relative movement of said workpiece during application of electroerosion potential across the gap between said filamentary electrode and said workpiece, whereby a predetermined contour may be machined;

means for propelling (13, 81, 82, 83, 84) a free end of said electrode (4) from or across said operating zone until it reaches said transport means (79) of said electrode driving and guiding system (7) on the take-up side of said operating zone, and electrode holding and cutting means (10) provided at one side of said operating zone and, at the other side of said operating zone, both electrode holding means (11) and electrode connecting means (12) (FIGS. 3 and 4).

3. Apparatus according to claim 2, in which said electrode holding and cutting means (10) comprises two half-plier members (143a, 143b) restrained by springs (146) and cutting means (151) all on a common fulcrum (153), and also a movable cam (145) arranged so that its movement is capable of bringing the whole of said holding and cutting means (10) into operating position, to actuate said half-plier members (143a, 143b), to close them around said electrode (4) and, by further movement, to actuate said cutting means (151) in the same direction to cut said electrode (4) (FIGS. 14a, 14b, 14c, 14d, 15a, 15b, 15c, 15d).

4. Apparatus according to claim 2, in which said electrode holding means (11) comprises electromagnetically actuated friction means (185) for holding said electrode at two spaced locations and sensing means (189b) for sensing the said electrode between said locations and for modifying in response to abnormal sensing, the operation of said transport means (79) on the portion of said electrode driving and guiding system located on the take-up side of said operating zone, said transport means (79) being disposed in proximity to said sensing means (189b) (FIGS. 17a, 17b).

5. Apparatus according to claim 2, in which said electrode connecting means (12) comprises a notched electrode positioning member (401), a soldering piston (402) and means for supplying (413, 414, 415, 416) a predetermined quantity of solder material (418) to the electrode portions (4a, 4b) for soldering them together (FIGS. 19a, 19b, 19c).

6. Apparatus as defined in claim 2, in which said electrode connecting means (12) comprises clamping plier means (503) and a clip magazine (501) between which the two electrode portions (4a, 4b) to be connected are arranged to be held, said clamping plier means (503) being means for applying a clip (518a) around both electrode portions (FIGS. 20a, 20b, 20c).

7. Apparatus according to claim 2, in which said electrode connecting means (12) comprises a rotatable member (302) provided with a radially extending sharp projection (303), said rotatable member being so located that in one rotational portion thereof said projection can penetrate between adjacent electrode portions (4a, 4b) respectively held in clamping means (300, 301) (FIGS. 18a, 18b, 18c) when said clamping means and said rotatable member are moved together, and in which means are provided for moving said rotatable member and said clamping means together and thereafter rotating said member (302) to twist said electrode portion together.

8. Apparatus according to claim 7, in which said electrode connecting means (12) further comprises stripping means (390) at least partially surrounding said rotatable member (302) for stripping said electrode portions, as twisted together, from said projection (303) (FIGS. 18a, 18b, and 18c).

9. Apparatus for electroerosion machining comprising:
dispenser means for holding and dispensing a supply of a filamentary electrode;
means for driving and guiding said filamentary electrode from said dispenser means, through an operating zone to a take-up location, said driving and guiding means including a dispensing transport means (75) and a take-up transport means (79) respectively located on opposite sides of said operating zone and including also guiding devices (77, 771, 77a, 772) for said filamentary electrode;
means on at least one side of said operating zone for applying electric potential to said filamentary electrode;
means for holding a workpiece at least partly in said operating zone in proximity to said filamentary electrode;
electronic machining control means for causing relative movement of said workpiece during application of electroerosion potential across the gap between said filamentary electrode and said workpiece, whereby a predetermined contour may be machined;
means for propelling (13, 81, 82, 83, 84) a free end of said electrode (4) from or across said operating zone until it reaches said transport means (79) of said electrode driving and guiding system (7) on the take-up side of said operating zone, and
combined means (15) for electrode holding, electrode cutting and electrode connecting located at one side of said operating zone (FIG. 5).

10. Apparatus according to claim 9, in which said combined electrode holding, electrode cutting and electrode connecting means (15) comprises:
two half-plier members (143a, 143b) restrained by springs and provided with a conical centering surface (162) and a centering bore (163) for temporarily receiving said grapple means (13, 164), said half-plier members (143a, 143b) being arranged to close about said electrode (4) and to hold said electrode in response to movement of said cam (145);
cutting means (151) for cutting said electrode (4) in response to a further movement of said cam (146);
said grapple means (13, 164) being arranged to dispose said electrode portions (4a, 4b) grasped therewith into adjacent parallel positions, and
twisting plier means (165) rotatable in a bore (168) and axially displaceable therein for twisting the two electrode portions (4a, 4b) together (FIGS. 21a, 21b, 21c, 21d).

11. Apparatus for electroerosion machining comprising:
dispenser means for holding and dispensing a supply of a filamentary electrode;
means for driving and guiding said filamentary electrode from said dispenser means, through an operating zone to a take-up location, said driving and guiding means including a dispensing transport means and a take-up transport means respectively located on opposite sides of said operating zone and including also guiding devices (77, 771, 77a, 772) for said filamentary electrode;
means on at least one side of said operating zone for applying electric potential to said filamentary electrode;
means for holding a workpiece at least partly in said operating zone in proximity to said filamentary electrode;
electronic machining control means for causing relative movement of said workpiece during application of electroerosion potential across the gap between said filamentary electrode and said workpiece, whereby a predetermined contour may be machined;
means for propelling (13, 81, 82, 83, 84) a free end of said electrode (4) from or across said operating zone until it reaches said transport means (79) of said electrode driving and guiding system (7) on the take-up side of said operating zone, and electrode holding and cutting means (10) and electrode connecting means (12) located at one and the same side of said operating zone (FIG. 6).

12. Apparatus for electroerosion machining comprising:

dispenser means for holding and dispensing a supply of a filamentary electrode;

means for driving and guiding said filamentary electrode from said dispenser means, through an operating zone to a take-up location, said driving and guiding means including a dispensing transport means (75) and a take-up transport means (79) respectively located on opposite sides of said operating zone and including also guiding devices (77, 771, 77a, 772) for said filamentary electrode;

means on at least one side of said operating zone for applying electric potential to said filamentary electrode;

means for holding a workpiece at least partly in said operating zone in proximity to said filamentary electrode;

electronic machining control means for causing relative movement of said workpiece during application of electroerosion potential across the gap between said filamentary electrode and said workpiece, whereby a predetermined contour may be machined;

means for propelling (13, 81, 82, 83, 84) a free end of said electrode (4) from or across said operating zone until it reaches said transport means (79) of said electrode driving and guiding system (7) on the take-up side of said operating zone, and grapple means (13) mounted on that part of said electrode driving and guiding means (7) located on the take-up side of said operating zone, said grapple means (13) being equipped with annular grasping arms (132, 133) pivoted on a common pivot axis (134) and actuatable by a drive motor (3a) for grasping said electrode (4) and holding it fast (FIGS. 9a, 9b, 10, 11, 12, 13).

13. Apparatus for electroerosion machining comprising:

dispenser means for holding and dispensing a supply of a filamentary electrode;

means for driving and guiding said filamentary electrode from said dispenser means, through an operating zone to a take-up location, said driving and guiding means including a dispensing transport means (75) and a take-up transport means (79) respectively located on opposite sides of said operating zone and including also guiding devices (77, 771, 77a, 772) for said filamentary electrode;

means on at least one side of said operating zone for applying electric potential to said filamentary electrode;

means for holding a workpiece at least partly in said operating zone in proximity to said filamentary electrode;

electronic machining control means for causing relative movement of said workpiece during application of electroerosion potential across the gap between said filamentary electrode and said workpiece, whereby a predetermined contour may be machined;

means for propelling (13, 81, 82, 83, 84) a free end of said electrode (4) from or across said operating zone until it reaches said transport means (79) of said electrode driving and guiding system (7) on the take-up side of said operating zone, and grapple means (13) mounted on that part of said electrode driving and guiding means (7) located on the take-up side of said operating zone, said grapple means (13) being equipped with grasping members including split spreading grasping arms and means actuatable by a drive motor (3a) for constraining said grasping arms and thereby grasping said electrode (4) and holding it fast (FIGS. 9a, 9b, 10, 11, 12, 13).

14. An improved drive and guide assembly for use in an electroerosion machine tool, the assembly being for driving and guiding a filamentary erosion electrode from a supply thereof through a working zone where the electrode can produce erosion machining of a workpiece and thence away from the working zone, and the assembly including a dispensing device and a take-up device on respective sides of said zone for dispensing and taking up the electrode, wherein the improvement comprises the provision of:

means for dispensing (13, 81, 82, 83, 84) the free-starting end of the electrode from the dispensing device towards the take-up device, and for thereby operably engaging the electrode with the take-up device without manual stipulation of said electrode end, so that the take-up device can thereafter continuously take up the electrode as it is dispensed during a machining operation, and core-affixing means for sticking to and thereby supporting a core cut out of a workpiece by electroerosion machining for disposal of said core, comprising a container (212) for adhesive (215) and nozzle means (213) for applying said adhesive onto said core, said container and its nozzle being provided with a linkage for actuation by said electrode drive and guiding system (7) for applying said adhesive to said core (FIGS. 22a, 22b).

15. An improved drive and guide assembly for use in an electroerosion machine tool, the assembly being for driving and guiding a filamentary erosion electrode from a supply thereof through a working zone where the electrode can produce erosion machining of a workpiece and thence away from the working zone, and the assembly including a dispensing device and a take-up device on respective sides of said zone for dispensing and taking up the electrode, wherein the improvement comprises the provision of:

means for dispensing the free-starting end of the electrode from the dispensing device towards the take-up device, and for thereby operably engaing the electrode with the take-up device without manual manipulation of said electrode end, so that the take-up device can thereafter continuously take up the electrode as it is dispensed during a machining operation, said engaging means including grapple means (13) at the take-up side of the working zone equipped with grasping members (132, 133, 139) actuated by a drive motor (3a) for grasping said electrode (4) and holding it fast (FIGS. 9a, 9b, 10, 11, 12, 13).

* * * * *